United States Patent
Wyatt et al.

(10) Patent No.: US 9,088,734 B2
(45) Date of Patent: Jul. 21, 2015

(54) METHOD, SYSTEM AND APPARATUS FOR DETERMINING POSITION OF A WATERMARK ANNOTATION

(71) Applicant: CANON KABUSHIKI KAISHA, Tokyo (JP)

(72) Inventors: Peter Vincent Wyatt, Hunters Hill (AU); Andrew R. Coker, Macquarie Park (AU); Jun Liu, Dundas (AU); Matthew Scott Dalton, North Strathfield (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/060,984

(22) Filed: Oct. 23, 2013

(65) Prior Publication Data

US 2014/0118793 A1    May 1, 2014

(30) Foreign Application Priority Data

Oct. 31, 2012 (AU) .................................. 2012244309

(51) Int. Cl.
*H04N 1/32* (2006.01)
*G06T 11/60* (2006.01)
*H04N 1/60* (2006.01)
*G06K 15/02* (2006.01)

(52) U.S. Cl.
CPC ............ *H04N 1/32229* (2013.01); *G06T 11/60* (2013.01); *G06K 15/189* (2013.01)

(58) Field of Classification Search
USPC .......... 358/3.28, 1.15, 1.9; 382/100, 115, 116
See application file for complete search history.

(56) References Cited

U.S. PATENT DOCUMENTS

| | | | |
|---|---|---|---|
| 6,289,364 B1 | 9/2001 | Borg et al. | |
| 7,880,934 B2 | 2/2011 | Man | |
| 8,059,858 B2 * | 11/2011 | Brundage et al. | 382/100 |
| 2007/0291318 A1 * | 12/2007 | Wang et al. | 358/3.28 |

* cited by examiner

*Primary Examiner* — Quang N Vo
(74) *Attorney, Agent, or Firm* — Canon USA Inc IP Division

(57) ABSTRACT

A method is disclosed where an initial placement of a watermark annotation on an output medium associated with a page and placement of an area of the page, is determined. The determined initial placement is relative to the output medium and independent of the placement of the area of the page. The initial placement of the watermark annotation is adjusted so that the watermark annotation at least partially overlaps the area of the page.

18 Claims, 17 Drawing Sheets

| ANNOTATION PLACEMENT | |
|---|---|
| HORIZONTAL PLACEMENT | 30% |
| VERTICAL PLACEMENT | 80% |
| OVERLAP | YES |
| ALLOW SCALING | NO |
| ALLOW ROTATION | YES |

Fig. 8

METHOD, SYSTEM AND APPARATUS FOR DETERMINING POSITION OF A WATERMARK ANNOTATION

CROSS-REFERENCE TO RELATED PATENT APPLICATIONS

This application claims the right of priority under 35 U.S.C. §119 based on Australian Patent Application No. 2012244309, filed 31 Oct. 2012, which is incorporated by reference herein in its entirety as if fully set forth herein.

TECHNICAL FIELD

The present invention relates to the field of page description languages, and, specifically representation and output of watermark annotations in page description languages. The present invention also relates to a method and apparatus for determining position of a watermark annotation, and to a computer program product including a computer readable medium having recorded thereon a computer program for determining position of a watermark annotation.

BACKGROUND

When a document defined in a page description language (PDL) is output (e.g., to a printer), there are many use cases which benefit from the ability to define a watermark superimposed or composited with content of the document. For example, an author of a document may intend that a particular document be designated as a draft version of the document. The document may therefore bear an inscription designating a printed copy of the document as a draft version, in order that a printed copy not be confused with a finalised version of the document. In further examples, a document might feature a watermark indicating that the document is a representative sample only, and should not be issued to a commercial customer. A document may also be marked as being secret, and have a watermark reminding all persons who handle an output copy of the document to take special precautions to maintain secrecy of the content. As another example, a watermark may bear important safety or procedural instructions as to how depicted content should be used. In some cases, using a watermark provides a means to protect copyright or assert intellectual property ownership of the contents of a document.

A watermark may be as simple as a single word or short phrase in a single font. As another example, a watermark may incorporate a company logo or any other arbitrary graphical elements.

In some documents, content that is intended as a watermark is expressed in the same way (e.g., in the page description language) as other content on the page. In this case, it is not possible to identify which content was intended as a watermark, and which is normal document content. However, a page description language, such as the Portable Document Format (PDF) published by the International Organisation for Standardization as ISO 32000-1:2008, may provide a means of designating document content as being a "watermark annotation". The page description language may ascribe a special semantic meaning to a particular item of document content that distinguishes that content as being an annotation that is a watermark. The particular item of the document content is therefore separate to normal content of a page within the document.

Annotations are items of content that are associated with a location on a particular page of a document, but are declared separately from the page content for that page. A computer program that interprets a document defined in such a page description language may then differentially process page content that is semantically marked as being a watermark annotation, such as controlling the appearance of a watermark annotation.

In some page description languages such as PDF, normal page content is typeset within an imageable page area defined by the document. In this instance, the position of each item of content is defined by a co-ordinate value. In contrast, for some other page description formats, content is dynamically repositioned to fill available space if, for example, dimensions of an output or display medium change. An imageable page area may be defined by specifying values for the height and width of the page. Objects that comprise the page content may then be placed upon the page using a co-ordinate system defined in terms of that imageable page area.

A page description language such as PDF may allow some types of annotation content (e.g., watermark annotations) to be placed upon an output medium using a placement value that is relative to actual dimensions of the output medium itself. In cases where a page description language allows for the placement of a watermark annotation to be defined with respect to actual dimensions of an output medium (e.g., a printed page, a display), a situation may arise in which a watermark annotation is placed somewhere on the output medium that does not overlap with document content that is typeset for a particular page size. FIGS. 1A, 1B and 1C show several examples in which a watermark annotation (e.g., 103, 107, 116, 117, 118, 119) does not overlap an imageable area defined for each page 102, 106 and 114, respectively. In such a situation, the part of the output medium bearing the watermark annotation (e.g., 103) may be simply cut off or otherwise not utilised. In effect, actual document content is no longer protected by the watermark (e.g., 103), and the original intention of the document author for employing the use of a watermark is not carried out. A user of the document may furthermore intentionally take advantage of the non-overlapping behaviour by setting up print parameters in order for the situations of FIGS. 1A, 1B and 1C to explicitly arise. In some cases the user may be motivated by a desire to circumvent the role of the watermark as a security mechanism or a means to otherwise limit the use of the document content.

SUMMARY

It is an object of the present invention to substantially overcome, or at least ameliorate, one or more disadvantages of existing arrangements.

Disclosed are arrangements which provide a data structure associated with the definition of a watermark annotation within a page description language. The data structure provides parameters that govern the determination of a placement on an output medium for the annotation. Watermark annotations are placed relative to bounds of the output medium itself. Additional elements of the data structure indicate that the placement of the watermark annotation is to be adjusted, such that the watermark annotation at least partially overlaps with the page area defined by the page description language.

According to one aspect of the present disclosure there is provided a computer implemented method comprising:

determining an initial placement of a watermark annotation on an output medium associated with a page and placement of an area of the page, the determined initial placement being relative to the output medium and independent of the placement of the area of the page;

determining if the initial placement of the watermark annotation needs to be adjusted; and adjusting the initial placement of the watermark annotation so that the watermark annotation at least partially overlaps the area of the page.

According to another aspect of the present disclosure there is provided an apparatus comprising:

a processor, and a memory storing instructions that, when executed by the processor, cause the system to:

determine an initial placement of a watermark annotation on an output medium associated with a page and placement of an area of the page, the determined initial placement being relative to the output medium and independent of the placement of the area of the page;

determine if the initial placement of the watermark annotation needs to be adjusted; and adjust the initial placement of the watermark annotation so that the watermark annotation at least partially overlaps the area defined of the page.

According to another aspect of the present disclosure there is provided a non-transitory computer-readable storage medium having recorded thereon storing a computer program that, when executed by a computer, causes the computer to:

determine an initial placement of a watermark annotation on an output medium associated with a page and placement of an area of the page, the determined initial placement being relative to the output medium and independent of the placement of the area of the page;

determine if the initial placement of the watermark annotation needs to be adjusted; and adjust the initial placement of the watermark annotation so that the watermark annotation at least partially overlaps the area defined of the page.

According to another aspect of the present disclosure there is provided a non-transitory computer readable medium comprising a page description language data structure stored thereon, the page description language data structure being part of a file defining a page description for an image in accordance with the page description language, the page description language having an imageable area defined by a height and width of a page, the imageable area being mapped by a transformation to a position on an output medium for displaying the page, wherein the page description language data structure is associated with an annotation within the page description, and wherein the page description language data structure indicates an annotation placement data structure for the annotation, the annotation placement data structure comprising:

a horizontal placement value for the annotation relative to dimensions of the output medium;

a vertical placement value for the annotation relative to the dimensions of the output medium; and one or more placement adjustment values that when combined with the horizontal and vertical placement values define a placement for the annotation on the output medium, wherein the placement of the annotation on the output medium is adjustable in accordance with the placement adjustment values such that the annotation at least partially overlaps with the position of the imageable area for the page.

Other aspects of the invention are also disclosed.

BRIEF DESCRIPTION OF THE DRAWINGS

One or more embodiments of the invention will now be described with reference to the following drawings, in which:

FIG. 8 shows an example annotation placement data structure;

DETAILED DESCRIPTION INCLUDING BEST MODE

Overview

Figure 1A:
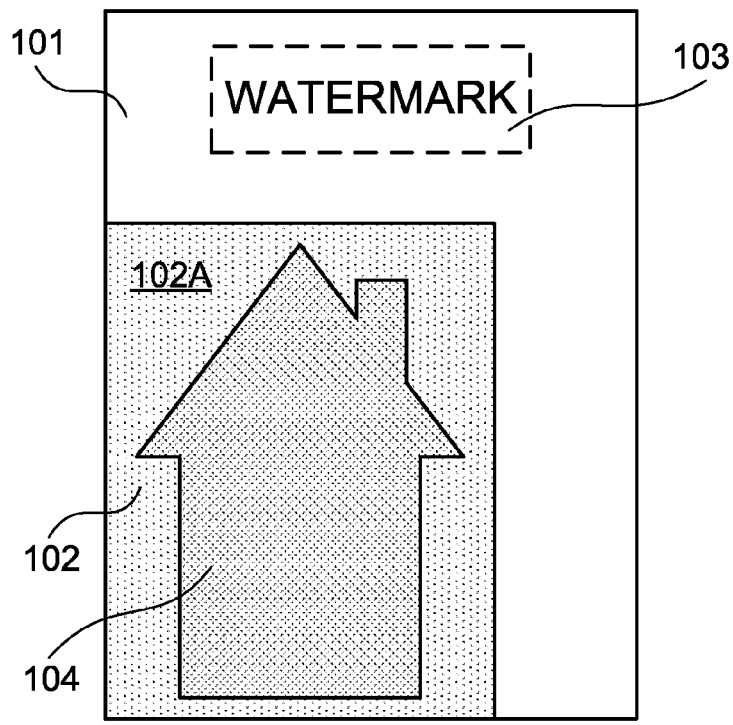
FIGS. 1A, 1B and 1C are block diagrams of output pages defined by a page description language, in which a watermark annotation does not overlap an imageable area defined for each page.

FIG. 1A shows an output medium 101 displaying a page 102 defined by a page description language. The page 102, as defined by the page description language, has a defined imageable area 102A which in FIG. 1A is smaller than output medium 101. The page 102 also has defined page content 104 that is located within the imageable area 102A for the page 102. A watermark annotation 103, defined by the page description language, is associated with the page 102, and therefore appears on the output medium 101.

In the example of FIG. 1A, the position of the watermark annotation 103 on output medium 101 is defined by the page description language such that the watermark annotation appears on the output medium 101 outside the bounds of the imageable area 102A of the page 102. The example of FIG. 1A may arise, for example, when a document is output on a printer with only a single paper tray containing a paper size larger than that defined by the printed document.

Figure 1B:
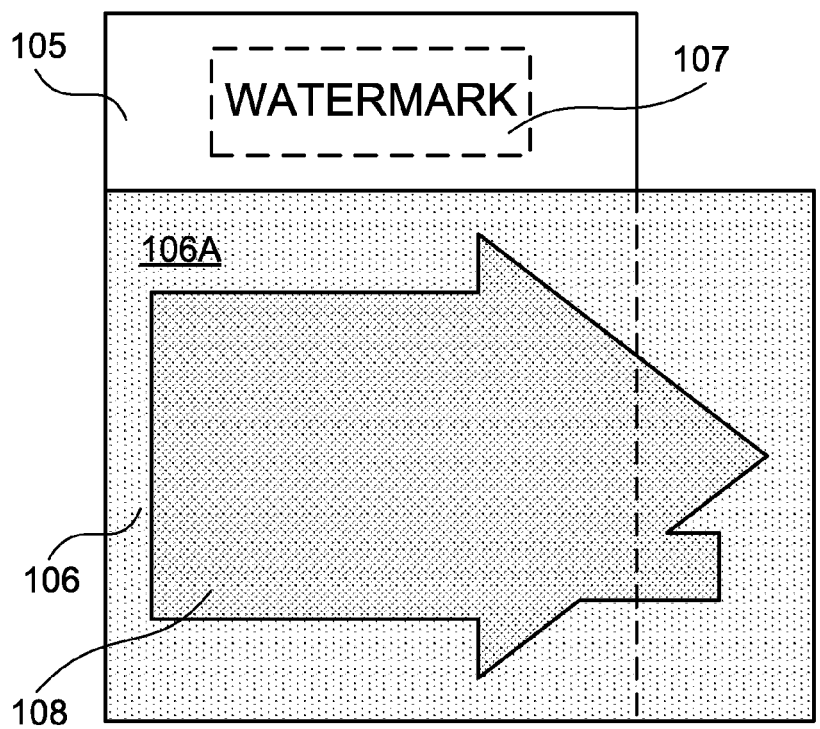

FIG. 1B shows an output medium 105 displaying a page 106 defined by a page description language. The page 106 contains page content 108, which lies within the bounds of an imageable area 106A of the page 106. In the example of FIG. 1B, the page 106 is the same size as the output medium 105, but the page 106 is rotated by 90 degrees, as might be the case if (for example) a landscape orientation page was output on a portrait orientation output medium. As described above, the example of FIG. 1B comprises a watermark annotation 107 associated with the page 106, defined such that the watermark annotation 107 appears on the output medium 105 outside the bounds of the imageable area 106A of the page 106 without rotation by 90 degrees. As seen in FIG. 1B, part of the imageable area 106A of the page 106, and of the page content 108 lies outside the bounds of the output medium 105, and as such will not be visible when the page 106 is output on the output medium 105.

Figure 1C:
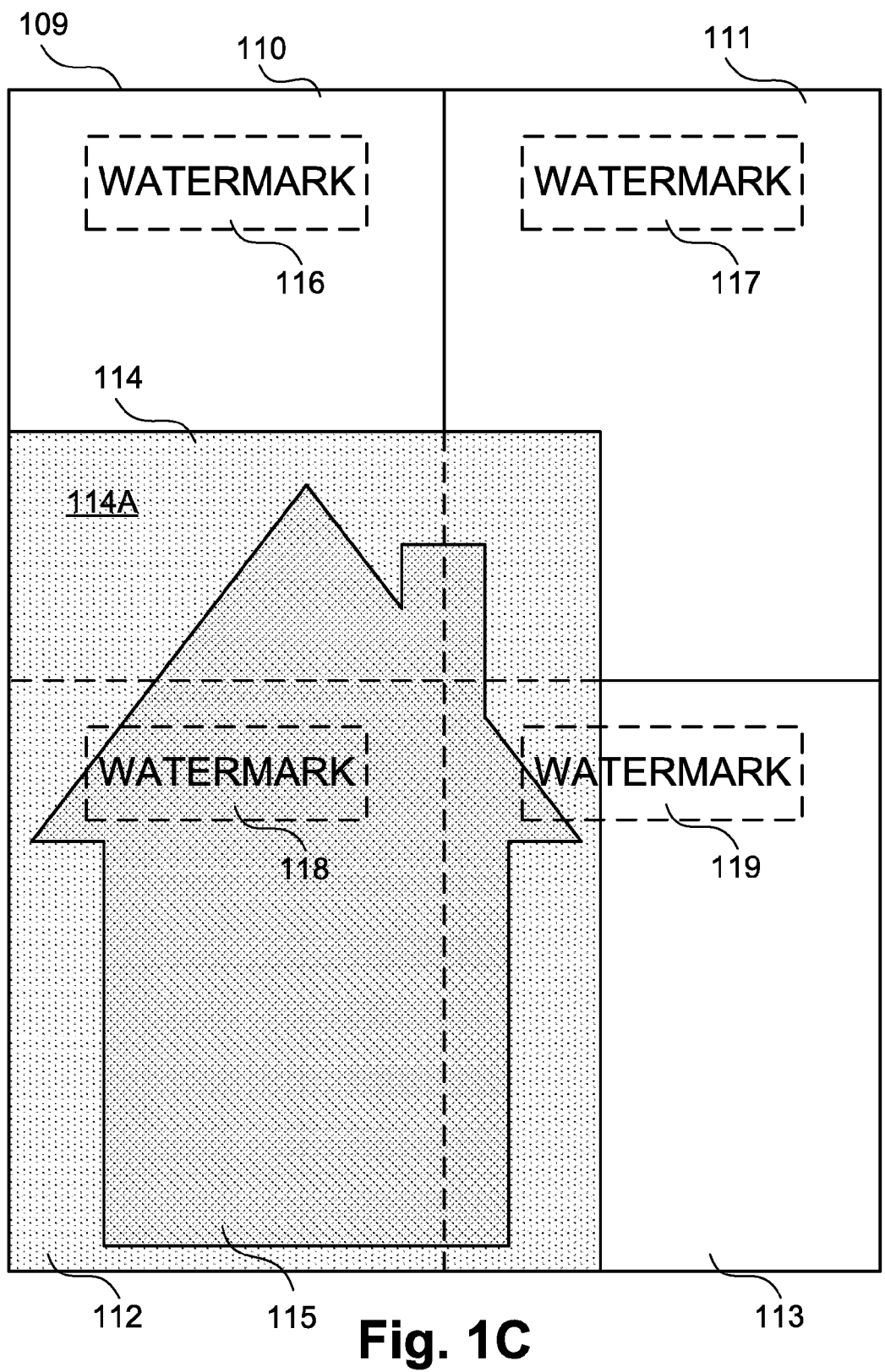

FIG. 1C shows a poster output medium 109 comprised of separate pieces of output media 110, 111, 112 and 113. As seen in FIG. 1C, imageable area 114A of a page 114 spans the separate pieces of output media 110, 111, 112 and 113, such that the pieces 110, 111, 112 and 113 may be assembled to form a contiguous poster image. Page content 115 appears within the imageable area 114A for the page 114. A watermark annotation associated with the page 114 appears four times—116, 117, 118 and 119—once for each piece of output media 110, 111, 112 and 113. In the example of FIG. 1C, watermark 118 appears within the bounds of the part of the imageable area 114A of the page 114 that appears on output medium 112, watermark 119 appears partially within the bounds of the part of the imageable area 114A of the page 114 that appears on output medium 113, and watermarks 116 and 117 appear outside the bounds of the parts of the imageable area 114A of the page 114 that appears on output media 110 and 111 respectively.

FIGS. 1A, 1B and 1C show specific examples in which a page defined in a page description language, having a defined width and height, is placed onto one or more pieces of output media (e.g., 101). Generically, in order to display a page on an output medium, some geometrical transformation is determined. The geometrical transformation mathematically transforms the position of objects defined within the co-ordinate system of the page into final positions for display on the output medium. The transformation may in some cases result in the transformed page bounds area filling the entire area of the output medium. In some cases, the transformation may result in the transformed page bounds area covering only part of the output media surface. In the case of poster output shown in FIG. 1C, the bounds area of the transformed page 114 spans multiple pieces of output media, some of which are fully covered (e.g., 112) and some of which are partially covered (e.g., 110, 111, 113). Each piece of the output media (110, 111, 112 and 113) displays a different part of the defined page 114.

FIGS. 1A, 1B and 1C show that initial position (or placement) of a watermark on an output medium defined by the page description language is independent of placement of the page (i.e., independent of the transformation of the page). FIGS. 1A, 1B and 1C also show that while position (or placement) of an object (or page content) 104, 108 and 115 on the output medium is dependent on the transformation of the page, the initial position (placement) of a watermark is a relative position with respect to the output medium.

In FIGS. 1A, 1B, 1C, 2, 3A, 3B, 3C and 9, example page content (e.g., 104) is represented generically as an outline of a house shape. However, page content as described here may be any arbitrary collection of any number of page content elements such as, for example, text, natural images, shadings or vector graphics.

Figure 10A:
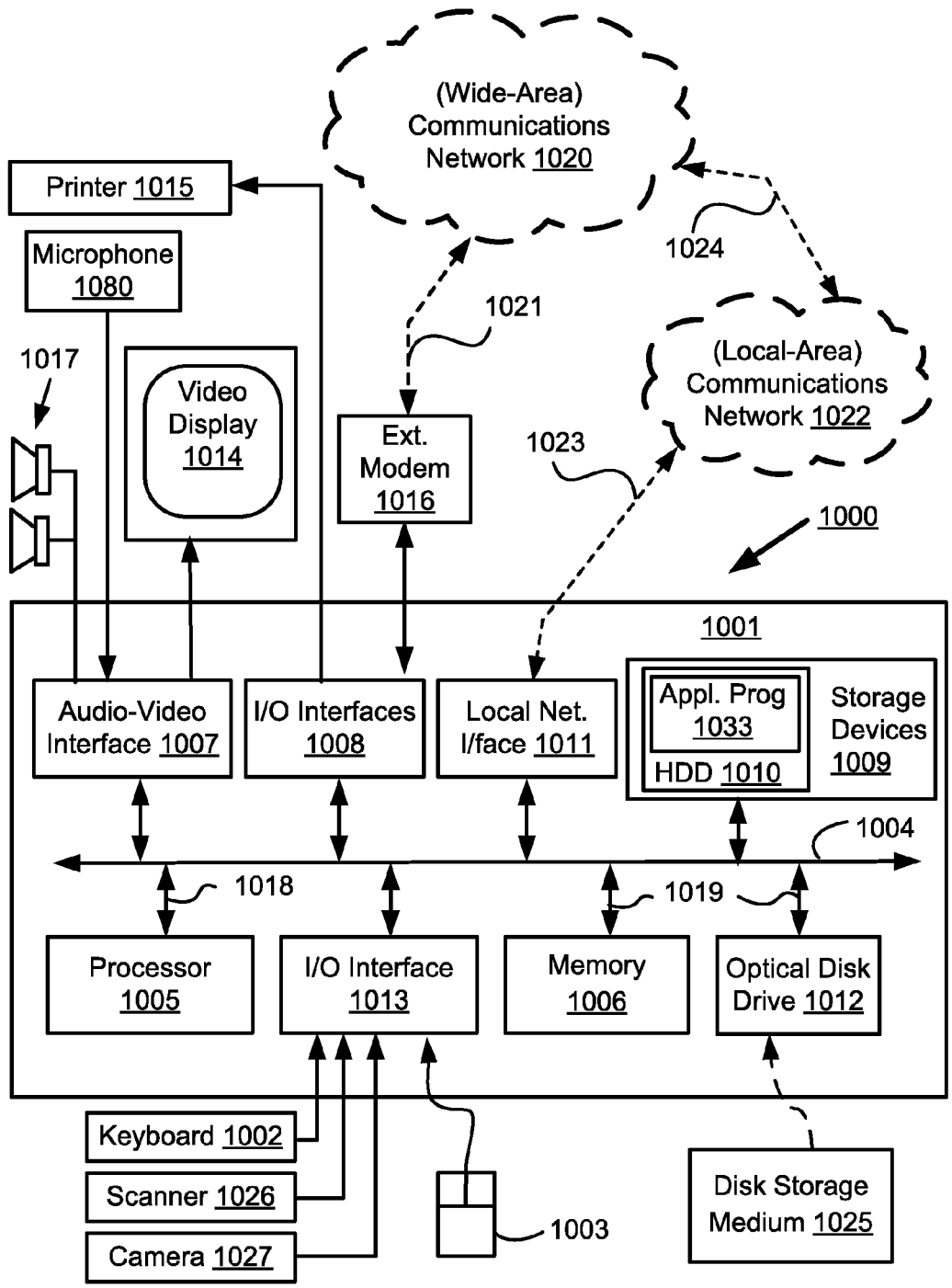
FIGS. 10A and 10B form a schematic block diagram of a general purpose computer system upon which arrangements described can be practiced.
Figure 10B:
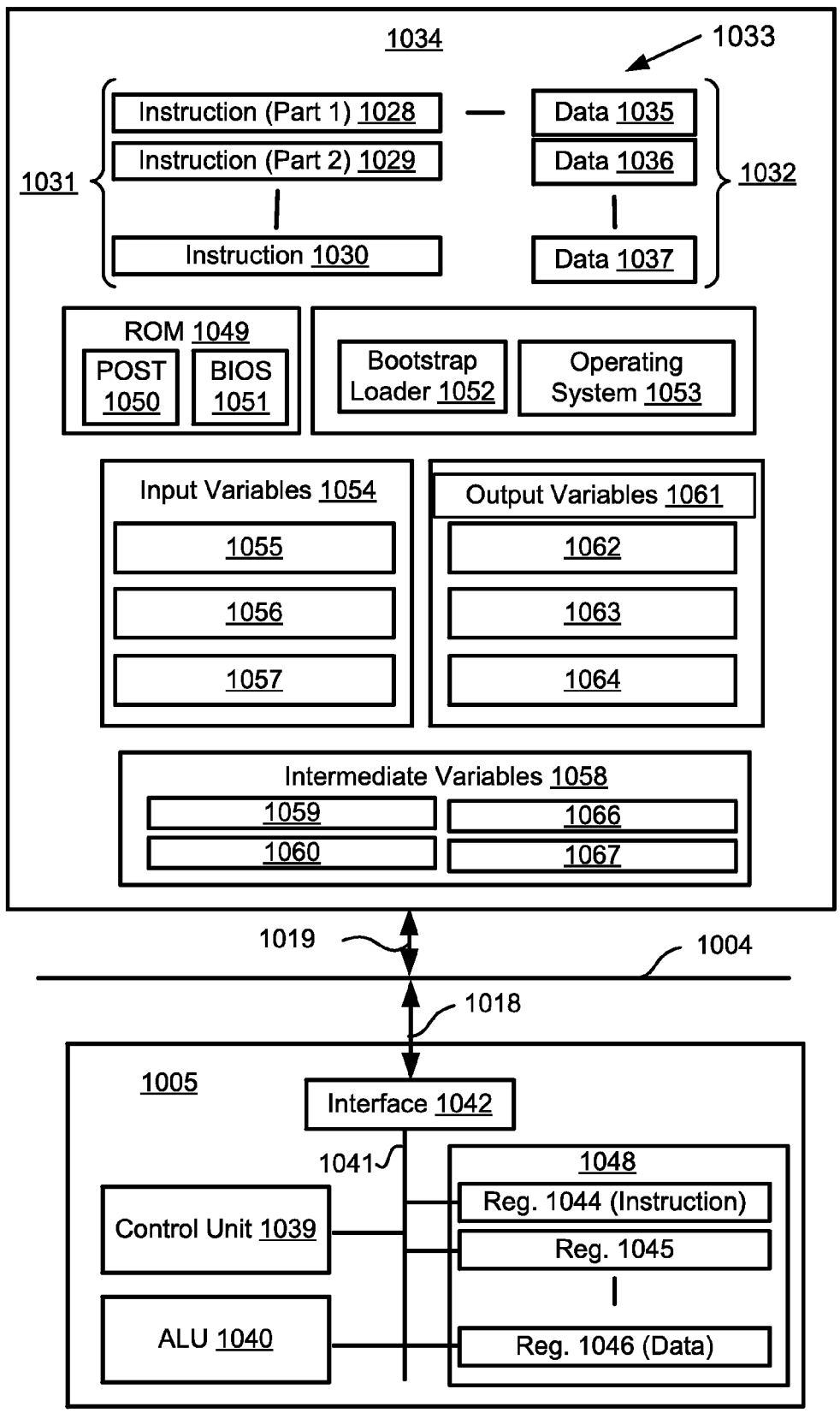

FIGS. 10A and 10B show a general-purpose computer system 1000, upon which the various arrangements described can be practiced. The described arrangements may also be practiced on lower-level devices such a mobile phone, a personal data assistant (PDA), a portable media player, a digital camera or the like, in which processing resources are limited relative to the computer system 1000. However, such lower-level devices may have a similar configuration to the system 1000 and will therefore not be described in detail here.

As seen in FIG. 10A, the computer system 1000 includes: a computer module 1001; input devices such as a keyboard 1002, a mouse pointer device 1003, a scanner 1026, a camera 1027, and a microphone 1080; and output devices including a printer 1015, a display device 1014 and loudspeakers 1017. An external Modulator-Demodulator (Modem) transceiver device 1016 may be used by the computer module 1001 for communicating to and from a communications network 1020 via a connection 1021. The communications network 1020 may be a wide-area network (WAN), such as the Internet, a cellular telecommunications network, or a private WAN. Where the connection 1021 is a telephone line, the modem 1016 may be a traditional "dial-up" modem. Alternatively, where the connection 1021 is a high capacity (e.g., cable) connection, the modem 1016 may be a broadband modem. A wireless modem may also be used for wireless connection to the communications network 1020.

The computer module 1001 typically includes at least one processor unit 1005, and a memory unit 1006. For example, the memory unit 1006 may have semiconductor random access memory (RAM) and semiconductor read only memory (ROM). The computer module 1001 also includes an number of input/output (I/O) interfaces including: an audio-video interface 1007 that couples to the video display 1014, loudspeakers 1017 and microphone 1080; an I/O interface 1013 that couples to the keyboard 1002, mouse 1003, scanner 1026, camera 1027 and optionally a joystick or other human interface device (not illustrated); and an interface 1008 for the external modem 1016 and printer 1015. In some implementations, the modem 1016 may be incorporated within the computer module 1001, for example within the interface 1008. The computer module 1001 also has a local network interface 1011, which permits coupling of the computer system 1000 via a connection 1023 to a local-area communications network 1022, known as a Local Area Network (LAN). As illustrated in FIG. 10A, the local communications network 1022 may also couple to the wide network 1020 via a connection 1024, which would typically include a so-called "firewall" device or device of similar functionality. The local network interface 1011 may comprise an Ethernet™ circuit card, a Bluetooth™ wireless arrangement or an IEEE 802.11 wireless arrangement; however, numerous other types of interfaces may be practiced for the interface 1011.

The I/O interfaces 1008 and 1013 may afford either or both of serial and parallel connectivity, the former typically being implemented according to the Universal Serial Bus (USB) standards and having corresponding USB connectors (not illustrated). Storage devices 1009 are provided and typically include a hard disk drive (HDD) 1010. Other storage devices such as a floppy disk drive and a magnetic tape drive (not illustrated) may also be used. An optical disk drive 1012 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1000.

The components 1005 to 1013 of the computer module 1001 typically communicate via an interconnected bus 1004 and in a manner that results in a conventional mode of operation of the computer system 1000 known to those in the relevant art. For example, the processor 1005 is coupled to the system bus 1004 using a connection 1018. Likewise, the memory 1006 and optical disk drive 1012 are coupled to the system bus 1004 by connections 1019. Examples of computers on which the described arrangements can be practised include IBM-PC's and compatibles, Sun Sparcstations, Apple Mac™ or a like computer systems.

Methods described below may be implemented using the computer system 1000 wherein the processes of FIGS. 4, 5, 6 and 7, to be described, may be implemented as one or more software application programs 1033 executable within the computer system 1000. In particular, the steps of the described methods are effected by instructions 1031 (see FIG. 10B) in the software 1033 that are carried out within the computer system 1000. The software instructions 1031 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 1033 is typically stored in the HDD 1010 or the memory 1006. The software is loaded into the computer system 1000 from the computer readable medium, and then executed by the computer system 1000. Thus, for example, the software 1033 may be stored on an optically readable disk storage medium (e.g., CD-ROM) 1025 that is read by the optical disk drive 1012. A computer readable medium having such software or computer program recorded on the computer readable medium is a computer program product. The use of the computer program product in the computer system 1000 preferably effects an advantageous apparatus for implementing the described methods.

In some instances, the application programs 1033 may be supplied to the user encoded on one or more CD-ROMs 1025 and read via the corresponding drive 1012, or alternatively may be read by the user from the networks 1020 or 1022. Still further, the software can also be loaded into the computer system 1000 from other computer readable media. Computer readable storage media refers to any non-transitory tangible storage medium that provides recorded instructions and/or data to the computer system 1000 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 1001. Examples of transitory or non-tangible computer readable transmission media that may also participate in the provision of software, application programs, instructions and/or data to the computer module 1001 include radio or infra-red transmission channels as well as a network connection to another computer or networked device, and the Internet or Intranets including e-mail transmissions and information recorded on Websites and the like.

The second part of the application programs 1033 and the corresponding code modules mentioned above may be executed to implement one or more graphical user interfaces (GUIs) to be rendered or otherwise represented upon the display 1014. Through manipulation of typically the keyboard 1002 and the mouse 1003, a user of the computer system 1000 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1017 and user voice commands input via the microphone 1080.

FIG. 10B is a detailed schematic block diagram of the processor 1005 and a "memory" 1034. The memory 1034 represents a logical aggregation of all the memory modules (including the HDD 1009 and semiconductor memory 1006) that can be accessed by the computer module 1001 in FIG. 10A.

When the computer module 1001 is initially powered up, a power-on self-test (POST) program 1050 executes. The POST program 1050 is typically stored in a ROM 1049 of the semiconductor memory 1006 of FIG. 10A. A hardware device such as the ROM 1049 storing software is sometimes referred to as firmware. The POST program 1050 examines hardware within the computer module 1001 to ensure proper functioning and typically checks the processor 1005, the memory 1034 (1009, 1006), and a basic input-output systems software (BIOS) module 1051, also typically stored in the ROM 1049, for correct operation. Once the POST program 1050 has run successfully, the BIOS 1051 activates the hard disk drive 1010 of FIG. 10A. Activation of the hard disk drive 1010 causes a bootstrap loader program 1052 that is resident on the hard disk drive 1010 to execute via the processor 1005. This loads an operating system 1053 into the RAM memory 1006, upon which the operating system 1053 commences operation. The operating system 1053 is a system level application, executable by the processor 1005, to fulfill various high level functions, including processor management, memory management, device management, storage management, software application interface, and generic user interface.

The operating system 1053 manages the memory 1034 (1009, 1006) to ensure that each process or application running on the computer module 1001 has sufficient memory in which to execute without colliding with memory allocated to another process. Furthermore, the different types of memory available in the system 1000 of FIG. 10A must be used properly so that each process can run effectively. Accordingly, the aggregated memory 1034 is not intended to illustrate how particular segments of memory are allocated (unless otherwise stated), but rather to provide a general view of the memory accessible by the computer system 1000 and how such is used.

As shown in FIG. 10B, the processor 1005 includes a number of functional modules including a control unit 1039, an arithmetic logic unit (ALU) 1040, and a local or internal memory 1048, sometimes called a cache memory. The cache memory 1048 typically includes a number of storage registers 1044-1046 in a register section. One or more internal busses 1041 functionally interconnect these functional modules. The processor 1005 typically also has one or more interfaces 1042 for communicating with external devices via the system bus 1004, using a connection 1018. The memory 1034 is coupled to the bus 1004 using a connection 1019.

The application program 1033 includes a sequence of instructions 1031 that may include conditional branch and loop instructions. The program 1033 may also include data 1032 which is used in execution of the program 1033. The instructions 1031 and the data 1032 are stored in memory locations 1028, 1029, 1030 and 1035, 1036, 1037, respectively. Depending upon the relative size of the instructions 1031 and the memory locations 1028-1030, a particular instruction may be stored in a single memory location as depicted by the instruction shown in the memory location 1030. Alternately, an instruction may be segmented into a number of parts each of which is stored in a separate memory location, as depicted by the instruction segments shown in the memory locations 1028 and 1029.

In general, the processor 1005 is given a set of instructions which are executed therein. The processor 1105 waits for a subsequent input, to which the processor 1005 reacts to by executing another set of instructions. Each input may be provided from one or more of a number of sources, including data generated by one or more of the input devices 1002, 1003, data received from an external source across one of the networks 1020, 1002, data retrieved from one of the storage devices 1006, 1009 or data retrieved from a storage medium 1025 inserted into the corresponding reader 1012, all depicted in FIG. 10A. The execution of a set of the instructions may in some cases result in output of data. Execution may also involve storing data or variables to the memory 1034.

The disclosed arrangements use input variables 1054, which are stored in the memory 1034 in corresponding memory locations 1055, 1056, 1057. The disclosed arrangements produce output variables 1061, which are stored in the memory 1034 in corresponding memory locations 1062, 1063, 1064. Intermediate variables 1058 may be stored in memory locations 1059, 1060, 1066 and 1067.

Referring to the processor 1005 of FIG. 10B, the registers 1044, 1045, 1046, the arithmetic logic unit (ALU) 1040, and the control unit 1039 work together to perform sequences of micro-operations needed to perform "fetch, decode, and execute" cycles for every instruction in the instruction set making up the program 1033. Each fetch, decode, and execute cycle comprises:

a fetch operation, which fetches or reads an instruction 1031 from a memory location 1028, 1029, 1030;

a decode operation in which the control unit 1039 determines which instruction has been fetched; and an execute operation in which the control unit 1039 and/or the ALU 1040 execute the instruction.

Thereafter, a further fetch, decode, and execute cycle for the next instruction may be executed. Similarly, a store cycle may be performed by which the control unit 1039 stores or writes a value to a memory location 1032.

Each step or sub-process in the processes of FIGS. 4, 5, 6 and 7 is associated with one or more segments of the program 1033 and is performed by the register section 1044, 1045, 1047, the ALU 1040, and the control unit 1039 in the processor 1005 working together to perform the fetch, decode, and execute cycles for every instruction in the instruction set for the noted segments of the program 1033.

The described methods may alternatively be implemented in dedicated hardware such as one or more integrated circuits performing the functions or sub functions of the described methods. Such dedicated hardware may include graphic processors, digital signal processors, or one or more microprocessors and associated memories.

Figure 4:
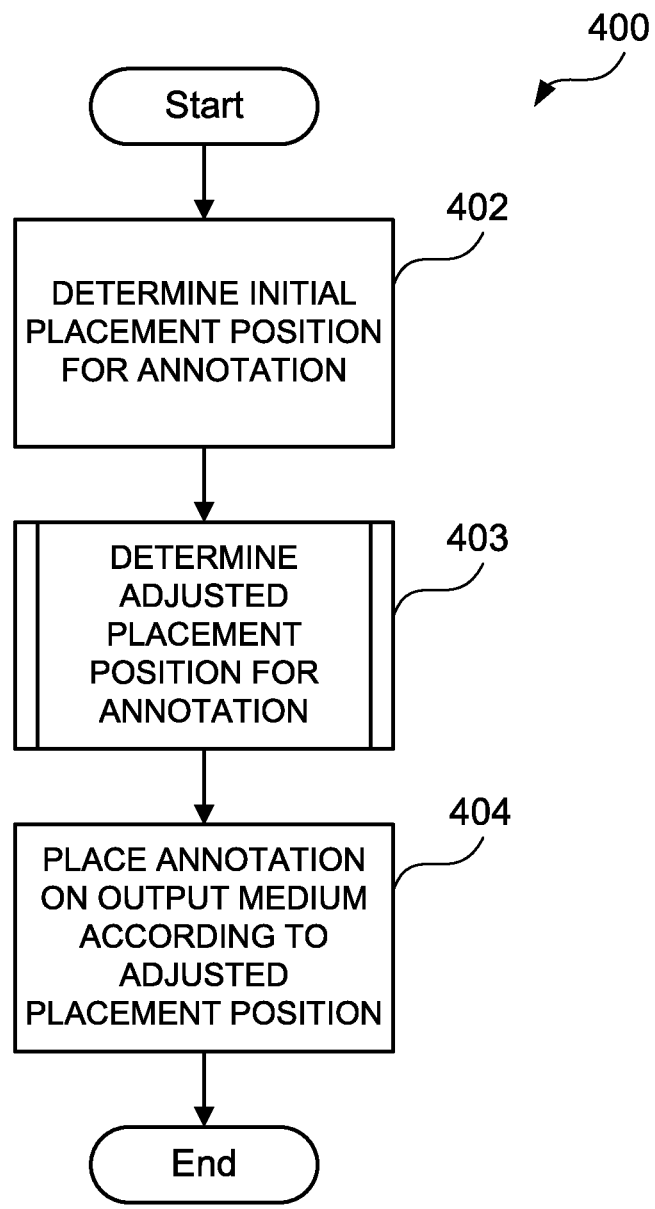
FIG. 4 is a schematic flow diagram showing a method of determining position of a watermark annotation.

FIG. 4 is a schematic flow diagram showing a method 400 of determining position of a watermark annotation. The method 400 may be performed in order to display a watermark annotation on an output medium. The method 400 may be implemented as one or more code modules of the software application program 1033 resident on the module 1001 and being controlled in its execution by the processor 1005.

The method 400 begins at placement determining step 402 in which the software 1033, under execution of the processor 1005, determines an initial position to place ("initial placement") the watermark annotation on an output medium. The initial placement determined at step 402 may be stored as co-ordinate values within the RAM 1006. The watermark annotation is associated with a page that appears on the output medium. The page and the initial placement of the watermark annotation may be defined by a page description language. In one arrangement, the page and the initial placement of the watermark annotation may be defined in accordance with the Portable Document Format (PDF) file format.

As described in more detail below, the "initial placement" of the watermark annotation is comprised of a position component, a rotation factor component and a scaling factor component. In one arrangement, step 402 is performed independently of and without consideration of the size of an imageable area of the page displayed on the output medium. Thus the initial placement of the watermark annotation is defined relatively to the output medium regardless of an imageable area of the page. In such an arrangement, one corner of the area of the watermark annotation is positioned at a co-ordinate that is determined by calculating a horizontal position, and a vertical position. The horizontal position is a certain ratio of width of the output medium, the ratio being defined in a data structure stored within the memory 1006 for the watermark annotation. A vertical position of the co-ordinate is also determined at step 402. The vertical position is another certain ratio of height of the output medium, the ratio also being defined in the data structure stored for the watermark annotation. The watermark annotation itself, may be an object defined in the page description language, and has a defined height and width. Hence, both the initial position and extent of the watermark annotation may be determined. The initial placement determined at step 402 comprises values for position, size and rotation of the watermark annotation. The initial position (placement) of the watermark is compared with a position (placement) of the imageable area of the page on the output medium. If the initial position of the watermark does not at least partially overlap with the position (placement) of the imageable area of the page, then the method 400 proceeds to step 403. In one arrangement, at step 402, the software 1033, under execution of the processor 1005, also determines placement (or position) of the imageable area of the page.

Then at adjusting step 403, the software 1033, under execution of the processor 1005, determines if the initial placement of the watermark annotation needs to be adjusted. If the software 1033 determines that the initial placement of the watermark annotation needs to be adjusted, the software 1033 determines an adjusted placement. The adjusted placement is determined by adjusting the initial placement of the watermark annotation so that the watermark annotation at least partially overlaps an imageable area defined by the page. Again, the adjusted placement may be stored as co-ordinate values within the RAM 1006. A method 500 of determining an adjusted placement of the watermark annotation, as executed at step 403, will be described in detail below with reference to FIG. 5. Step 403 may result in placement of the watermark annotation being adjusted, or in other cases step 403 may result in the placement remaining the same. In adjusting a placement, changes may be made to any or all of the placement components—position, scaling factor and rotation factor.

The method 400 concludes at placement step 404, where the software 1033, under execution of the processor 1005, places the watermark annotation upon the output medium for display, according to the adjusted placement determined in step 403.

After following the processing steps of the method 400, the placement of the watermark annotation is such that the watermark annotation at least partially overlaps the part of an imageable rectangle of a page that appears on the output medium.

Figure 5:
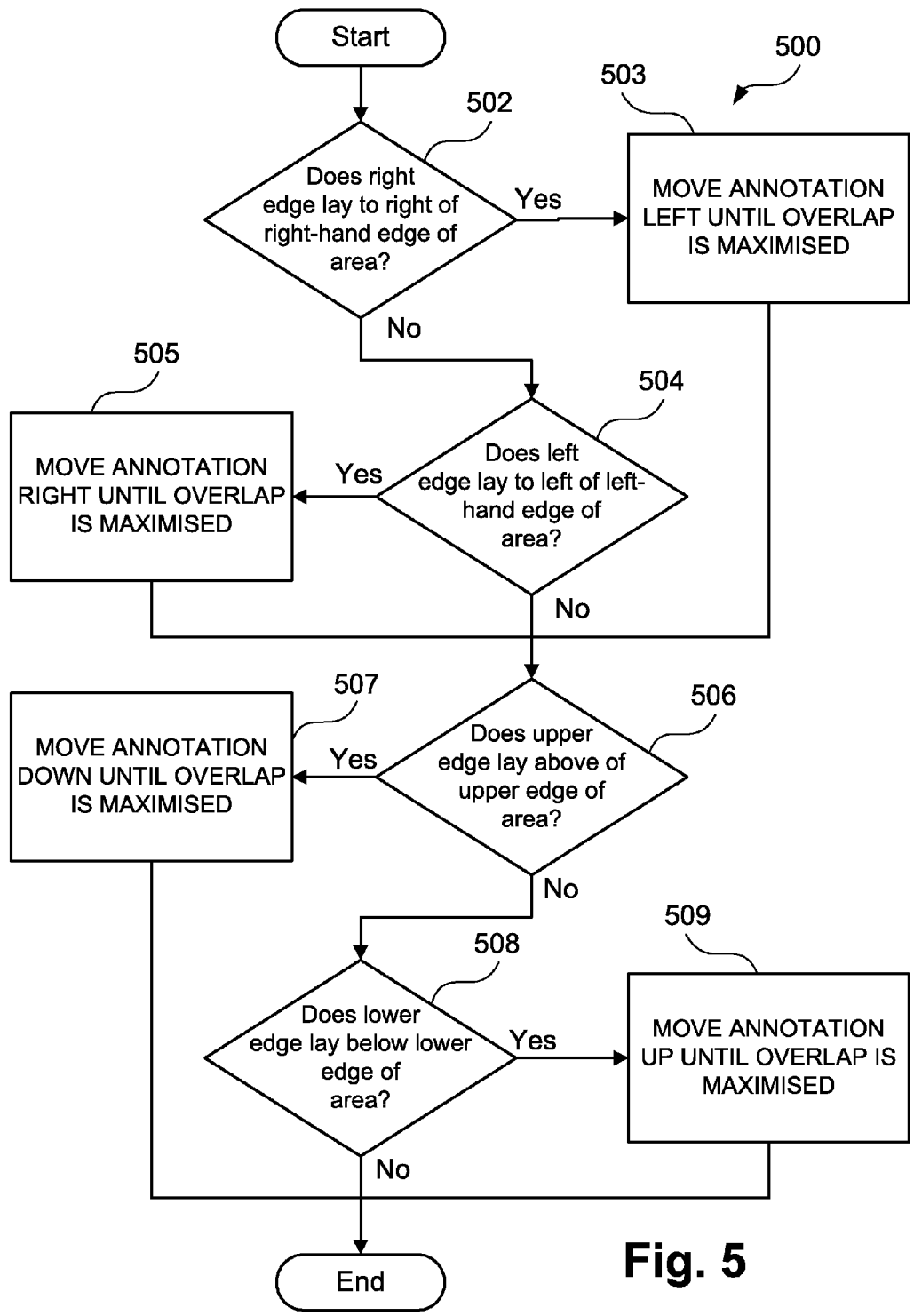
FIG. 5 is a schematic flow diagram showing a method of determining an adjusted position of a watermark annotation as executed in the method of FIG. 4.

The method 500 of determining an adjusted placement for a watermark annotation in step 403, will now be described with reference to FIG. 5. The method 500 may be implemented as one or more code modules of the software application program 1033 resident on the hard disk drive 1010 and being controlled in its execution by the processor 1005.

The method 500 begins at decision step 502 in which the software 1033 compares the right-hand edge of the extent of the watermark annotation to the right-hand edge of the part of the imageable area of the page that appears on the output medium. If the right-hand edge of the watermark annotation lays to the right of the right-hand edge of the imageable area of the page, then with respect to the horizontal axis, at least part of the watermark annotation is placed outside the bounds of the imageable area of the page. In this case, the processing proceeds to step 503 as seen in FIG. 5. Otherwise, processing proceeds to step 504.

At step 503, the software 1033, under execution of the processor 1005, adjusts the placement of the watermark annotation, as determined at step 402, by moving the position of the watermark until the overlap is maximised. The placement of the watermark annotation may be adjusted at step 503 by modifying the horizontal position co-ordinate values of the placement stored in RAM 1006 at step 402. The horizontal position values of the placement may be modified relative to dimensions of an output medium being used to display the page. In one arrangement, to maximise the overlap means to move the placement of the watermark annotation to the left by an amount such that neither the left-hand edge of the watermark annotation goes past the left-hand edge of the imageable area of the page, nor does the right-hand edge of the watermark annotation go past the right-hand edge of the imageable area of the page. Hence, the horizontal position of the watermark annotation is moved by a smallest amount necessary to get the most overlap possible in the horizontal direction.

At decision step 504, the software 1033 compares the left-hand edge of the extent of the watermark annotation to the left-hand edge of the part of the imageable area of the page that appears on the output medium. If the left-hand edge of the watermark annotation lays to the left of the left-hand edge of the imageable area of the page, then with respect to the horizontal axis, at least part of the watermark annotation is placed outside the bounds of the imageable area of the page. In this case, processing proceeds to step 505 as seen in FIG. 5. Otherwise, processing proceeds to step 506.

At position step 505, the software 1033, under execution of the processor 1005, moves the position of the watermark annotation as determined at step 402 to the right until the amount of overlap of the watermark annotation with the imageable area of the page upon the output medium is maximised in the horizontal direction. Again, the horizontal position of the watermark annotation is moved by a smallest amount necessary to get the most overlap possible in the horizontal direction in a similar manner to step 503 described above. Further, the placement of the watermark annotation may be adjusted at step 505 by modifying the position co-ordinate values of the placement stored in RAM 1006 at step 402.

At decision step 506, the software 1033 compares the upper edge of the watermark annotation with the upper edge of the imageable area of the page upon the output medium, to determine if the position of the watermark annotation should be adjusted by moving the annotation downwards. If the upper edge of the watermark annotation lies above of the upper edge of the imageable area of the page, then at least part of the watermark annotation is placed outside the bounds of the imageable area of the page. In this case, processing proceeds to step 507 as seen in FIG. 5. Otherwise, processing proceeds to step 508.

At position step 507, the software 1033, under execution of the processor 1005, moves the position of the watermark annotation as determined at step 402 down until the amount of overlap of the watermark annotation with the imageable area of the page upon the output medium is maximised in the vertical direction. Again, the vertical position of the watermark annotation is moved by a smallest amount necessary to get the most overlap possible in the vertical direction in a similar manner to step 503 described above. Further, the position component of the placement of the watermark annotation may be adjusted at step 507 by modifying vertical position co-ordinate values stored in RAM 1006 at step 402. The vertical position component of the placement co-ordinate values may be modified relative to dimensions of an output medium being used to display the page.

At decision step 508, the software 1033 compares the lower edge of the watermark annotation with the lower edge of the imageable area of the page upon the output medium, to determine if the position of the watermark annotation should be adjusted by moving the annotation upwards. If the lower edge of the watermark annotation lies below the lower edge of the imageable area of the page, then with respect to the vertical direction, at least part of the watermark annotation is placed outside the bounds of the imageable area of the page. In this case, processing proceeds to step 509 as seen in FIG. 5. Otherwise, the method 500 concludes.

At position step 509, the software 1033, under execution of the processor 1005, moves the position of the watermark annotation as determined at step 402 up until the amount of overlap of the watermark annotation with the imageable area of the page upon the output medium is maximised in the vertical direction. Again, the vertical position of the watermark annotation is moved by a smallest amount necessary to get the most overlap possible in the vertical direction in a similar manner to step 503 described above. Further, the position component of the placement of the watermark annotation may be adjusted at step 503 by modifying the position co-ordinate values stored in RAM 1006 at step 402.

As described above processing and decision steps 506, 507, 508 and 509 perform analogous steps to steps 502, 503, 504 and 505 as described above, except steps 506, 507, 508 and 509 apply to the vertical placement of the watermark annotation with respect to the upper and lower bounds of the imageable area of the page upon the output medium.

After performing the processing steps of the method 500, the position component of the placement of the watermark annotation as determined at step 402 has been moved by the smallest amount that causes the most amount of overlap with the imageable area of the page upon the output medium. Accordingly, the position of the watermark annotation at least partially overlaps the imageable area of the page. Although there may be some part of the extent of the watermark annotation that still lays outside the bounds of the imageable area of the page. The processing steps of the method 500 adjust the position of the watermark annotation on the page. The rotation component of the placement of the watermark annotation is not affected by the method 500. Further, the scaling component of the placement of the watermark annotation is not affected by the method 500.

Figure 2:
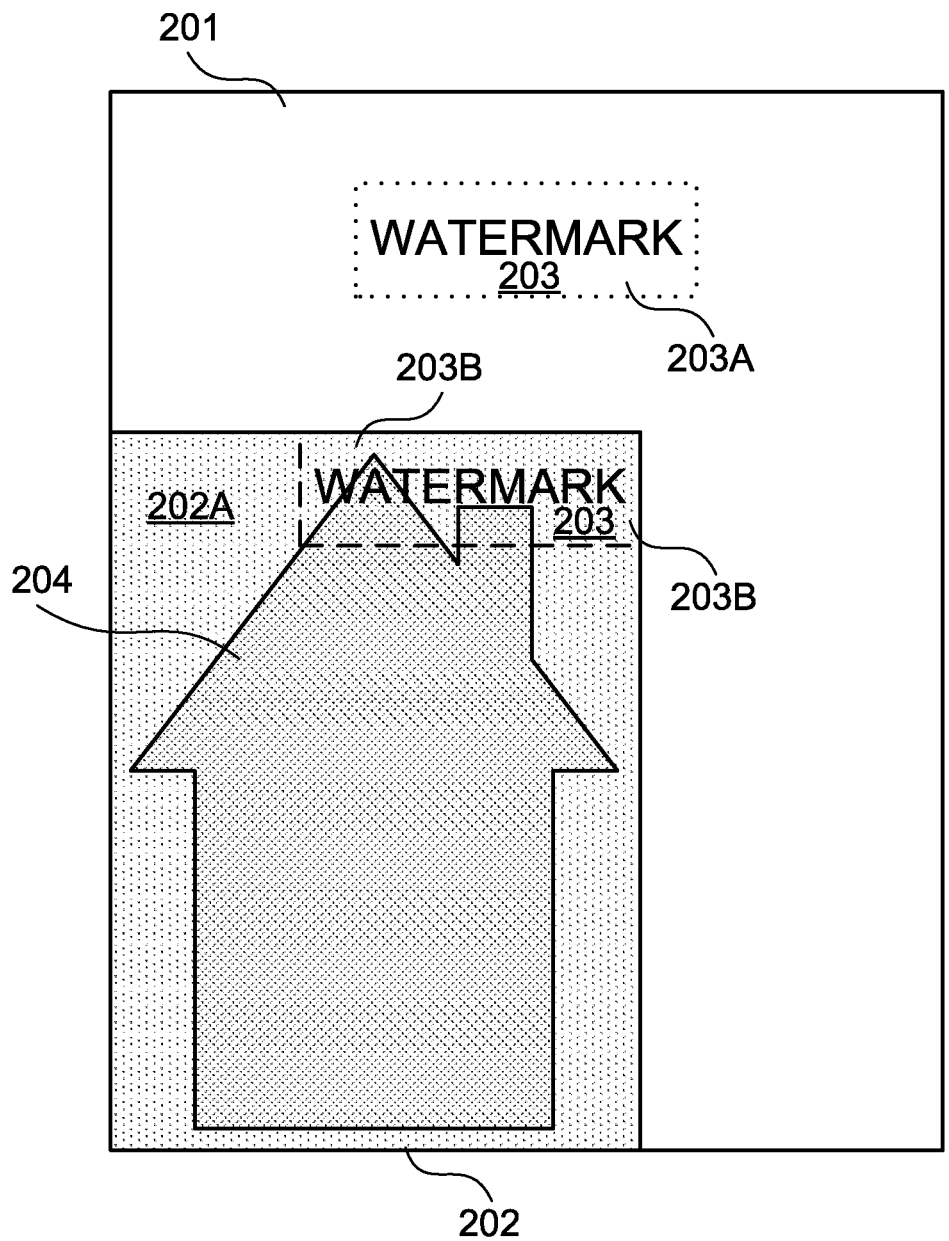
FIG. 2 shows an example of placement of a watermark annotation being adjusted in accordance with the method of FIG. 5.

The methods 400 and 500 will be described further by way of example with reference to FIG. 2. As seen in FIG. 2, an imageable area 202A of a portion of a page 202 defined in the page description language is displayed upon an output medium 201. Page content 204 lies within the bounds of the imageable area 202A of the page 202. As seen in FIG. 2, an initial placement 203A of a watermark annotation 203 is shown as being outside the bounds of the imageable area 202A of the page 202. In accordance with the example, the initial placement 203A of the watermark annotation 203 is adjusted using the methods 400 and 500 to move the watermark annotation 203 to adjusted position 203B so that the watermark annotation 203 overlaps the imageable area 202 as shown in FIG. 2.

Figure 3A:
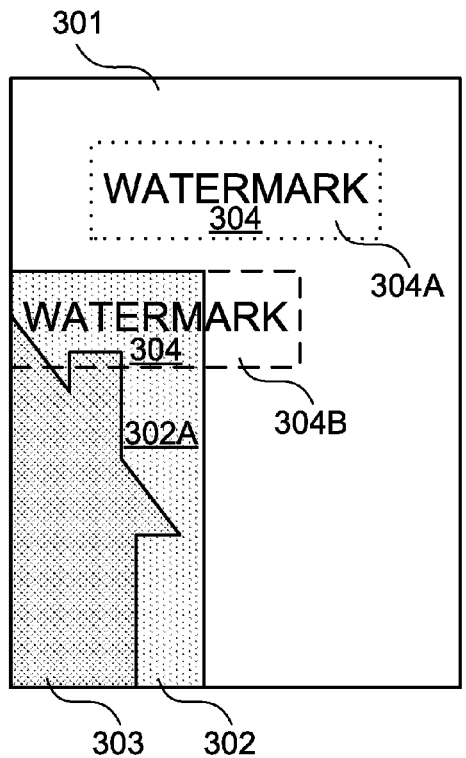
FIG. 3A shows an example of watermark annotation which is too wide to fit horizontally within an imageable area of a page.

FIG. 3A shows imageable area 302A of a portion of a page 202 defined in the page description language and displayed upon an output medium 301. Page content 303 appears within the bounds of the imageable area 302A of the page 302. In the example of FIG. 3A, a watermark annotation 304 is shown in an initial placement 304A completely outside the bounds of the imageable area 302A. The watermark annotation 304 is subject to the processing steps of the method 500, resulting in an adjusted placement 304B for the watermark 304 overlapping the imageable area 302A. As seen in FIG. 3A, the horizontal extent of defined watermark annotation 304 is too wide to fit horizontally within the width of the imageable area 302A of the page 302. An analogous situation may also arise in the vertical direction, for a watermark annotation that is too tall to fit within the height of the imageable area 302A of the page 302.

Figure 3B:
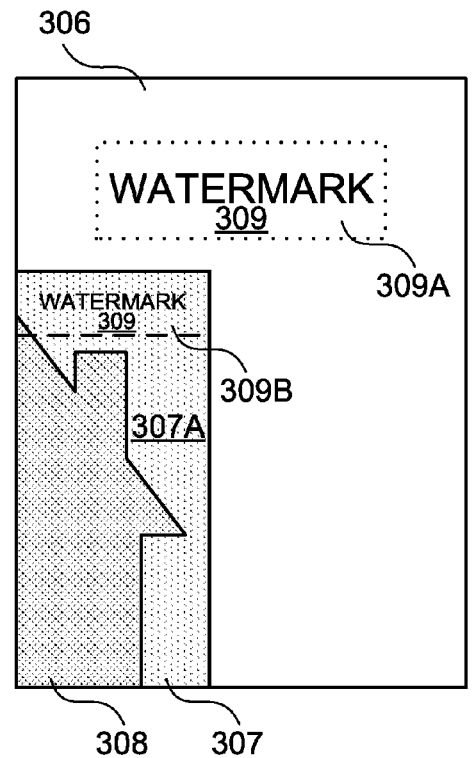
FIG. 3B shows an example of watermark annotation scaled to fit within an imageable area of a page.
Figure 6:
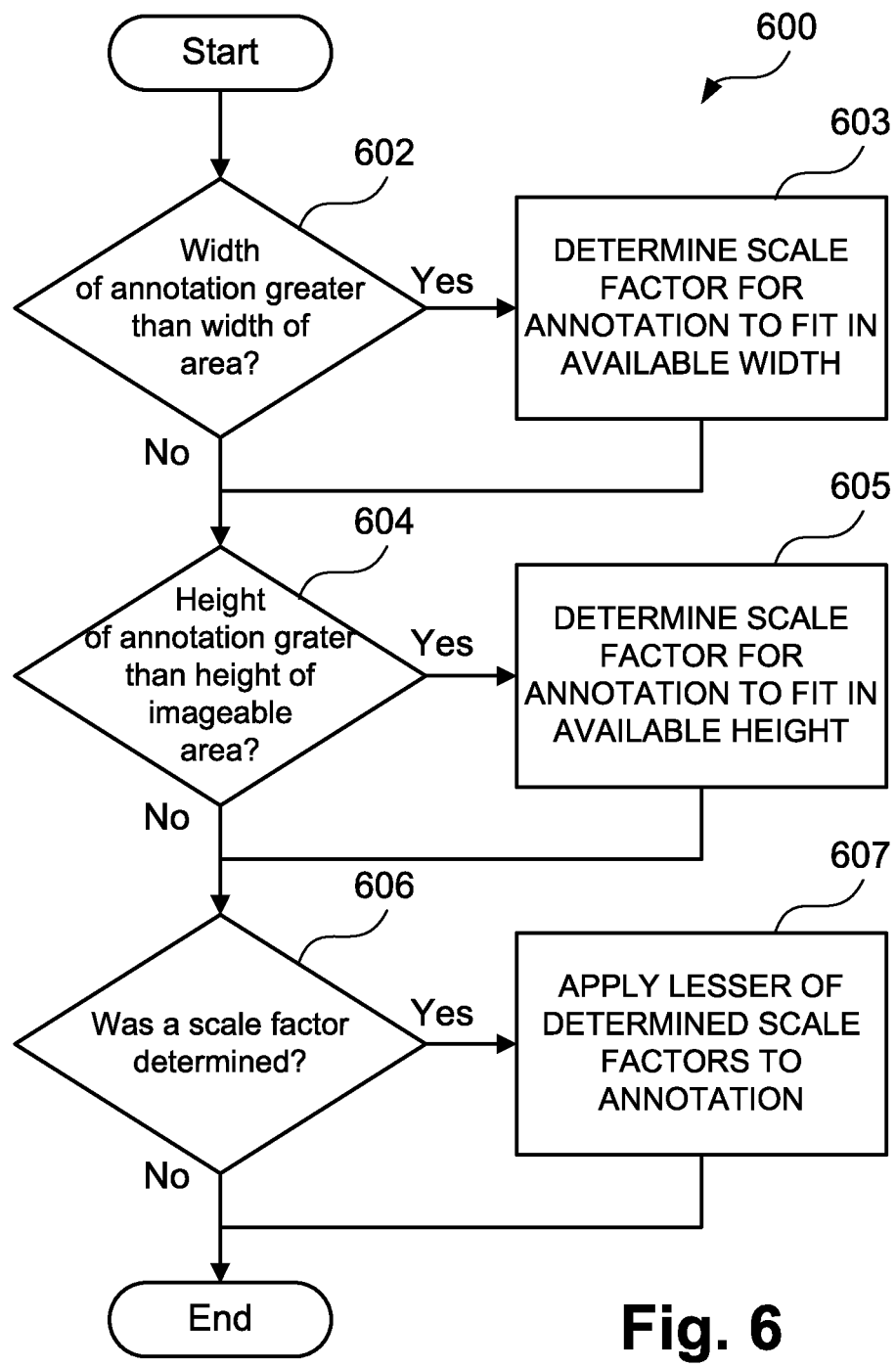
FIG. 6 is a schematic flow diagram showing a method of determining an adjusted scale factor for a watermark annotation.

In one arrangement, the scale factor of the watermark annotation (e.g., 304) may be adjusted such that the watermark annotation entirely fits within the imageable area (e.g., 302A) of the page 302, in cases where the watermark annotation would otherwise not fit. FIG. 3B shows an imageable area 307A of a portion of a page 307 defined in a page description language, displayed upon an output medium 306. Page content 308 appears within the bounds of the imageable area 307A of the page 307. In the example, a watermark annotation 309 in an initial placement 309A is subject to the processing steps of the methods 400 and 500, resulting in an adjusted placement 309B. As part of determining an adjusted placement for the watermark annotation 309, an adjusted scale factor has been determined, with the result that the watermark annotation 309 has been uniformly reduced in size such that the watermark annotation 309 entirely fits within the imageable area 307A of the page 307. FIG. 6 shows a method 600 of determining an adjusted scale factor for a watermark annotation 309 as shown in FIG. 3B. The method 600 may be executed at step 403 of the method 400, in addition to the method 500, for use in modifying the size of the watermark annotation 309.

The method 600 may be implemented as one or more code modules of the software application program 1033 resident within the module 1001 and being controlled in its execution by the processor 1005. The method 600 begins at decision step 602, where if the software 1033, under execution of the processor 1005, determines that the width of the watermark annotation is greater than the width of the imageable area of the page upon the output medium, then processing proceeds to step 603. Otherwise, processing proceeds to step 604.

At scaling factor step 603, the software 1033, under execution of the processor 1005, determines a scale factor for watermark annotation. The scale factor is determined so that when the scaled factor is applied to the watermark annotation the watermark annotation is scaled down to a width that entirely fits within the horizontal extent of the imageable area of the page. The necessary scale factor determined at step 603 is the ratio of width of the imageable area of the page and width of the annotation. The scale factor determined at step 603 may be stored within the RAM 1033.

At decision step 604, if the software 1033 determines that the height of the watermark annotation is greater than the height of the imageable area of the page upon the output medium, then processing proceeds to step 605. Otherwise, processing proceeds to step 606.

At scaling factor step 605, the software 1033, under execution of the processor 1005, determines a scale factor. The scale factor is determined at step 605 so that when scale factor is applied to the watermark annotation, the watermark annotation is scaled down to a height that entirely fits within the vertical extent of the imageable area of the page. The necessary scale factor is determined at step 605 so that the ratio of the heights of the annotation and of imageable area of the page, in accordance with Equation (1), as follows:

$$\text{Scale factor} = \text{height of annotation}/\text{height of imageable page area} \quad (1)$$

The scale factor is a numerical value. To apply the scale factor to the placement of the watermark annotation means that the height and width of the watermark annotation are each multiplied by the numerical value. The scale factor determined at step 605 may be stored within the RAM 1033.

After performing processing step 605, or after determining at 604 that a scale factor need not be calculated, processing flows to decision step 606. At decision step 606, if the software 1033 determines that a scale factor was determined at either or both of steps 603 and 605, then processing flows to step 607. Otherwise, the method 600 concludes.

At step 607, the minimum (or lesser) of the up to two scale factors that were determined in steps 603 or 605 is applied to the watermark annotation as an adjusted scale value for the placement of the watermark annotation. Step 607 therefore has the effect of ensuring that the watermark annotation entirely fits within the imageable area of the page upon the output medium in both the horizontal and vertical directions, and that the watermark annotation is not distorted. In some arrangements, a limit may be placed on the amount of scaling that may be applied to a watermark annotation, as the annotation may become difficult to view or read when shrunk down to a very small size.

Figure 3C:
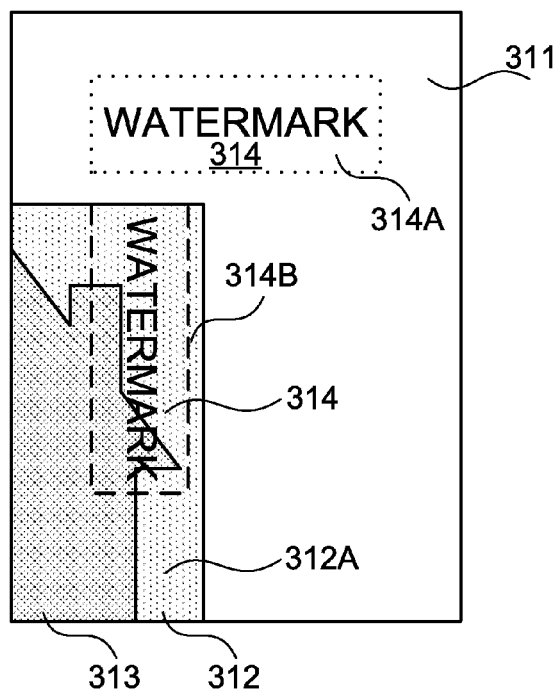
FIG. 3C shows an example of a watermark annotation rotated to fit within an imageable area of a page.

In yet another arrangement, the watermark annotation is rotated by 90 degrees in order to avoid excessive scaling down when the watermark annotation is adjusted to fit within the imageable area of the page upon the output medium. FIG. 3C shows an imageable area 312A of a page 312 defined in a page description language, displayed upon an output medium 311. Page content 313 appears within the bounds of the imageable area 312A of the page 312. In the example of FIG. 3C, a watermark annotation 314 in an initial placement 314A is subject to the processing steps the method 500 and 700, resulting in an adjusted placement 314B for the watermark 314 as seen in FIG. 3C. As part of determining an adjusted placement 314B for the watermark annotation 314, an adjusted rotation factor has been determined. The adjusted rotation factor is determined so that the watermark annotation 314 is rotated to fit within the imageable area 312A of the page 312.

Figure 7:
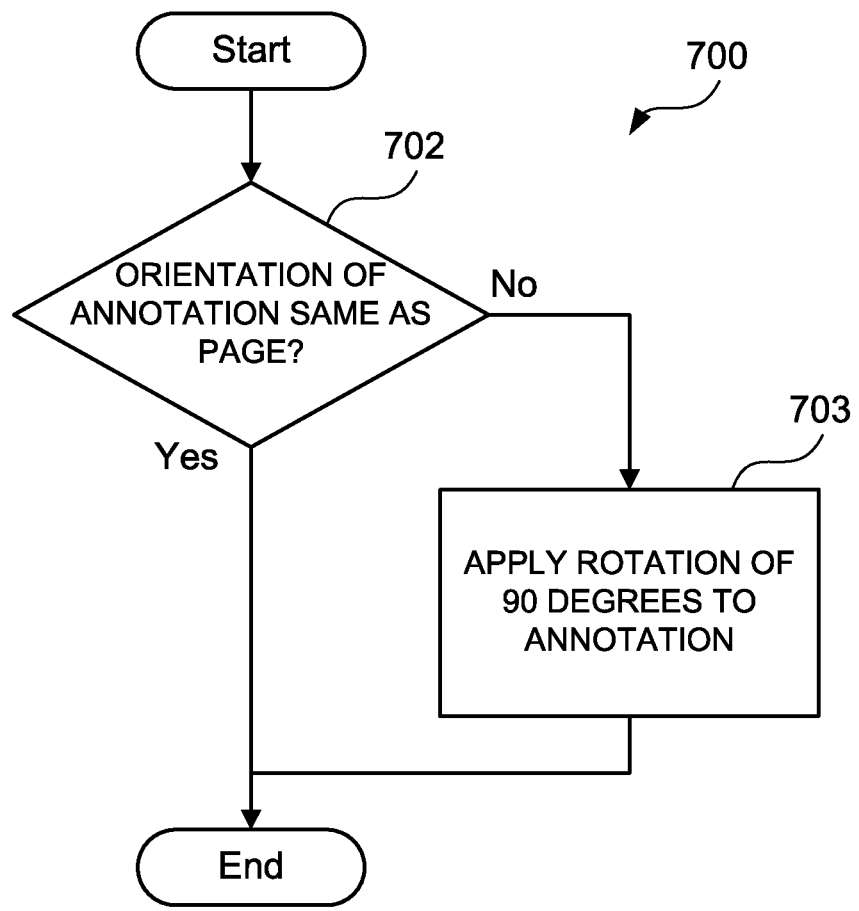
FIG. 7 is a schematic flow diagram showing a method of determining an adjusted rotation factor for a watermark annotation.

FIG. 7 shows a method 700 of determining an adjusted rotation factor for a watermark annotation 314 as shown in FIG. 3C. The method 700 may be executed at step 403 of the method 400, in addition to the method 500, for use in rotating the watermark annotation 314 about a point on the output medium 311 being used to display the page 312.

The method 700 may be implemented as one or more code modules of the software application program 1033 resident within the module 1001 and being controlled in its execution by the processor 1005.

The method 700 begins at decision step 702 where if the software 1033 determines that the orientation of the watermark annotation is the same as the orientation of the imageable area of the page upon the output medium, then the method 700 concludes. Otherwise, processing proceeds to step 703. The orientation of the watermark annotation and the imageable area may each be one of either landscape orientation or portrait orientation. If width of an item is greater than the height of the item then that item is in portrait orientation. Otherwise, the item is in landscape orientation. If the watermark annotation and imageable area of the page have different orientations (e.g., one is landscape and the other is portrait) then processing flows to step 703.

At step 703, the software 1033, under execution of the processor 1005, applies a rotation of ninety (90) degrees to the placement of the watermark annotation, yielding an adjustment to the placement of the watermark annotation. When applying a rotation as an adjustment to the placement of a watermark annotation, the rotation is made with some co-ordinate value acting as the centre of rotation. In one arrangement, the rotation adjustment occurs using the lower left hand corner of the watermark annotation as the centre of rotation. As seen in FIG. 3C, the watermark annotation 314 at initial placement 314A is rotated to placement 314B, using the lower left hand corner of the watermark annotation 314. In the example of FIG. 3C, after being rotated clockwise around its lower left hand corner, the watermark annotation 314 is then moved down by an amount that brings the watermark annotation 314 entirely within the bounds of the imageable area 312A of the page 312. In the example of FIG. 3C, the given initial placement 314A does not necessitate any horizontal movement of the watermark annotation 314 to arrive at a fully overlapping adjusted placement 314B.

The processing steps of the method 700 may be executed in addition to the processing steps of the method 600 as well as the method 500, resulting in a watermark annotation placement with adjusted position, adjusted scale factor and adjusted rotation.

A page description language typically defines ways to make declarative statements that describe the content of a document. The collection of declarative statements for a particular document may be assembled in memory 1006 of the computer system 100, or alternatively may be serialised to form a file for a document. A page description language defines the format for a particular type of declarative statement about the content of a document by providing a data structure for storing data fields that are relevant to the type of document content being declared. Such a data structure may be, for example, one of the following: an array, a dictionary, or a data stream.

In addition to providing a particular data structure in which declarative statements about content of a document are expected to be made, a page description language defines an expected result when that declarative statement is interpreted in order to produce an output result, such as a rendering of a page upon an output medium. Additionally, a page description language may dictate expected interactive behaviour when such declarative statements are interpreted within an interactive computer software application (e.g., 1033).

As described below, an annotation placement data structure may be provided within a page description language that is associated with a watermark annotation for a page. When a watermark annotation is declared as being associated with a page defined in the page description language, data fields belonging to the annotation placement data structure govern how the associated placement is to be adjusted according to the methods 400, 500, 600 and 700.

FIG. 8 shows an example annotation placement data structure 801. The data structure 801 may be stored, for example, on a computer readable storage medium including the storage devices described above. The data structure 801 is comprised of data fields, and is shown in FIG. 8 with example data values for use in adjusting the initial placement of a watermark annotation in accordance with the method 400. A 'horizontal placement' data field 802 has a horizontal placement value 803 of 30% in the example of FIG. 8. The value 803 is relative to dimensions of the output medium and indicates that the initial position component of the placement of the watermark annotation in step 402 in the horizontal direction is 30% of the way across the width of the output medium. A 'vertical placement' data field 804 has a vertical placement value 805 of 80% in the example of FIG. 8. The value 805 is relative to dimensions of the output medium and indicates that the initial position component of placement of the watermark annotation in step 402 in the vertical direction is 80% of the way up the height of the output medium.

The data structure 801 also comprises one or more placement adjustment values that when combined with the horizontal placement value 803 and vertical placement value 805 define a placement for the watermark annotation on the output medium. The data structure 801 comprises an 'overlap' data field 806 having a placement adjustment value 807 of "YES" in the example of FIG. 8. The value 807 indicates that the placement of the watermark annotation should be adjusted according to step 403. An 'allow scaling' data field 808 has a placement adjustment value 809 of "NO" in the example of FIG. 8. The value 809 indicates that when performing step 403, the processing steps of the method 600 should not be invoked in order to adjust the scaling factor for the placement of the watermark annotation. If, instead, the value for the data field 808 was "YES", then the processing steps of the method 600 would be invoked. An 'allow rotation' data field 810 has a placement adjustment value 811 of "YES" in the example of FIG. 8, indicating that when performing step 403, the method 700 should be invoked in order to adjust the rotation value for the placement of the watermark annotation. The placement of the watermark annotation on the output medium may be adjusted in accordance with the placement adjustment values 807, 809 and 811 such that the watermark annotation at least partially overlaps with the position of the imageable area of a page. That is, the placement of the watermark annotation on the output medium is adjusted in accordance with the placement adjustment values 807, 809 and 811.

A page description language interpreter preferably has defined behaviour when presented with a document that was defined for an earlier version of the specification for that page description language. If the annotation placement data structure 801 is missing one or more data fields, then defined default values for those fields may be applied. For example, when the data value 807 of the 'Overlap' data field 806 is missing, then the required behaviour may proceed as though the data value 807 was present with the value "YES".

In one arrangement, the annotation placement data structure 801 is recorded within a file encoded with a page description language (e.g., Portable Document Format (PDF)). The file in one part may comprise a page description language data structure used for defining a page description for an image in accordance with the page description language. The page description language may have an imageable area, as described above, defined by a height and width of a page, the imageable area being mapped by a transformation to a position on an output medium. The page description language data structure is associated with a watermark annotation within the page description where the page description language data structure indicates an annotation placement data structure for the annotation. For example, the annotation placement data structure 801 may be encoded as a fixed print dictionary associated with a watermark annotation.

A section of a document definition is shown below. The document definition section defines an example of a watermark annotation, and includes a dictionary that provides an example of the annotation placement data structure 801, containing the data fields 802, 804, 806, 808, 810 and corresponding values 803, 805, 807, 809 and 811, respectively.

```
%%WATERMARK ANNOTATION
20 0 obj
<<
  /Type /Annot
  /Subtype /Watermark
  /Rect [0 0 120 25]
  /AP << /N 30 0 R >>
  /FixedPrint 40 0 R
>>
endobj
%%ANNOTATION CONTENT STREAM
30 0 obj
<<
  /Length ...
  /Type /Xobject
  /BBox [0 0 120 25]
>>
stream
  ... % other commands
  BT
  1 0 0 1 1 1 Tm
  (Sample Only) Tj
  ET
  ... % other commands
endstream
endobj
%%ANNOTATION PLACEMENT
40 0 obj
<<
    /Type /FixedPrint
    /H 0.30
  /V 0.80
  /Overlap true
      /AllowScaling false
      /AllowRotation true
>>
endobj
```

In the example document definition above, an object with reference number twenty (20) is a dictionary that declares an annotation object of type watermark, with an annotation content stream declared in the stream object with reference number thirty (30), and an annotation placement data structure declared as a dictionary object with reference number forty (40). The actual annotation (object 20) is associated with a particular page of the document via a mechanism not shown in this example.

The annotation placement data structure 801, and corresponding representation within a page description language, may include other data fields, and is not limited to the data fields 802, 804, 806, 808 and 810 described above.

Figure 9:
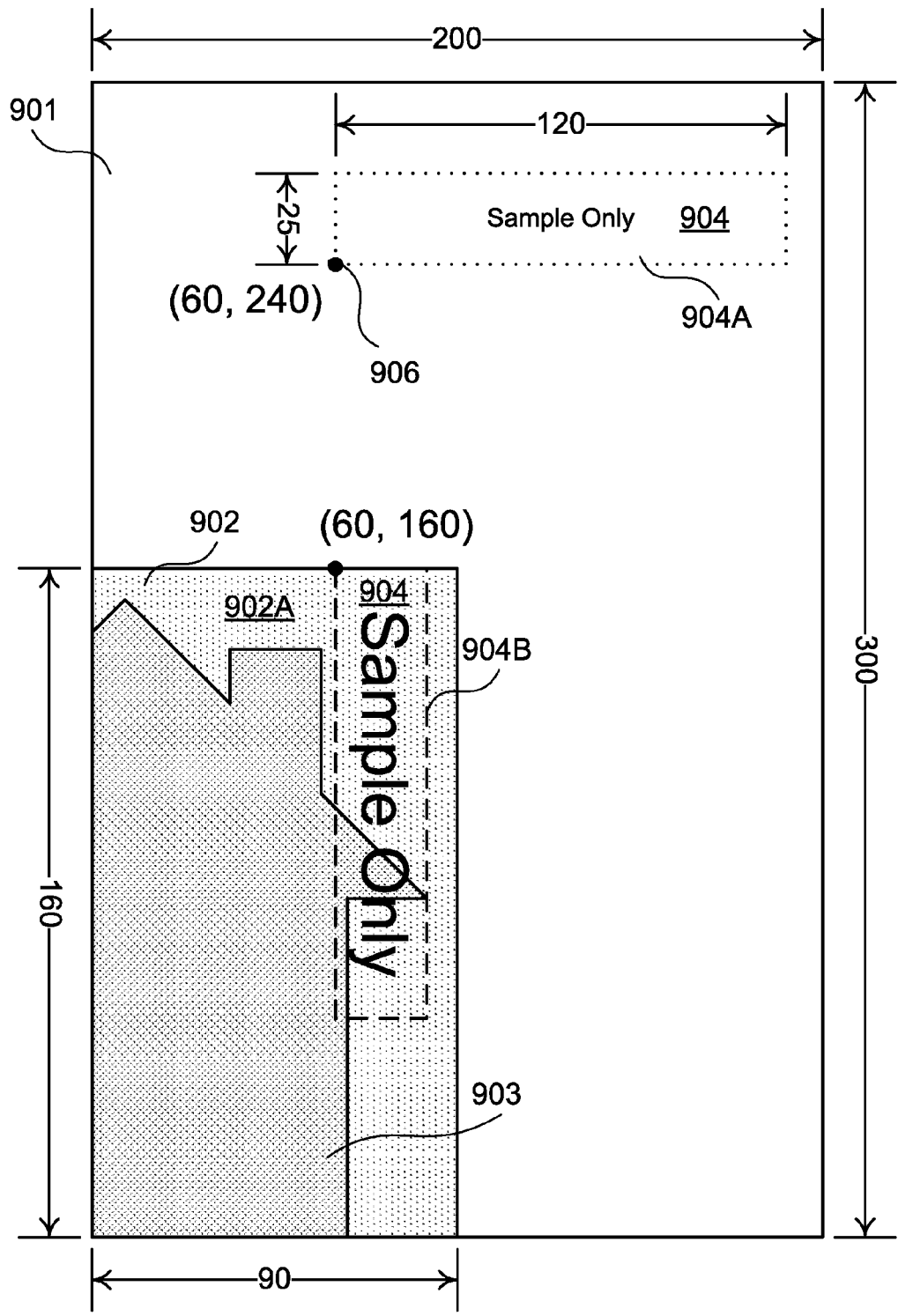
FIG. 9 shows an example of an adjusted placement determined for a watermark annotation.

The methods 400, 500, 600 and 700 described above will now be further described by way of example with reference to FIG. 9. FIG. 9 will be used to show an example of how the methods 400, 500, 600 and 700 determine an adjusted placement value for a watermark annotation 904 initially positioned at placement 904A. The example data values 803, 805, 807, 809 and 811 of the annotation placement data structure 801 of FIG. 9 will be used in the example of FIG. 9.

As seen in FIG. 9, an output medium 901 has size two-hundred (200) units in width and three-hundred (300) units in height. A transformed imageable area 902A for a page 902 defined in a page description language is positioned in lower left corner of the output medium 901. The imageable area 902A has size ninety (90) units in width and one-hundred and sixty (160) units in height. Page content 903 is situated within the bounds of the imageable area 902A of the page 902. The annotation placement data structure 801 associated with the watermark annotation 904 indicates a relative horizontal placement value 903 of 30%, and a relative vertical placement value 905 of 80%. An original placement value for the watermark annotation is determined at processing step 402 as being at position (60, 240). The watermark annotation 904 has size one-hundred and twenty (120) units in width and twenty-five (25) units in height. In performing step 403 to determine an adjusted placement for the watermark annotation 904, the 'allow rotation' data value 811 indicates that the steps of the method 700 are to be performed to determine a rotation component of the adjusted placement position value. In the example of FIG. 9, the steps of the method 700 results in a rotation of ninety (90) degrees to be applied to the adjusted placement value because the watermark annotation 904 has a landscape orientation and the imageable area 902 has a portrait orientation. Hence, a greater degree of overlap is possible under a ninety (90) degree rotation. The watermark annotation 904 is rotated clockwise around point 906 defined by the co-ordinate values (60, 240).

In performing the steps of the method 500, in order to determine a translation component for an adjusted placement 904B for the watermark annotation 904, it is determined at step 506 that the upper edge of the rotated watermark annotation 904 is in excess of the upper edge of the imageable area 902A. Therefore, the vertical position of the watermark annotation 904 is moved down from position 904A until a maximum amount of overlap with the imageable area 902A is achieved. In the example of FIG. 9, the rotated watermark annotation 904 can be entirely housed within the bounds of the imageable area 902A, as seen in FIG. 9, by moving the watermark annotation 904 to place position (60, 160). As seen in FIG. 9, a top edge of the rotated watermark annotation 904 coincides with the top edge of the imageable area 902A.

By applying processing steps in response to the annotation placement data structure 801 associated with the watermark annotation 904, the watermark annotation 904 now overlaps the transformed imageable area 902A. The situation evident for the original placement position 904A of the watermark annotation 904 (i.e., the watermark annotation 904 does not overlap the useful document content displayed upon the output medium 901 when in the position 904A) is therefore avoided.

One advantage of the above described methods is that document content is protected by means of a composited watermark annotation. The methods described above prevent a user from avoiding having a watermark annotation composited upon the content area of an output page from a page description language, whether by intentional circumvention or other unintentional action.

As the PDF format has grown in supported features and variety of definable constructs, there is an increasingly wide variety of possible uses and types of documents that can be represented in that page description language. PDF remains fundamentally a page-based description language, but has grown to support interactive and procedural content types. As a result, a PDF document may contain pages which should be presented to a user during certain types of interaction, and that should not be presented to a user in other types of interaction.

An end user of a PDF document may view the contents of that PDF document in an interactive manner, as is typical when the document is loaded into a PDF viewer application such as Adobe Acrobat or Adobe Reader. In such an interactive scenario, a user typically scrolls through the available pages, or uses an interactive table of contents for the document to navigate to particular pages of interest via hyperlinks. The PDF viewer application makes available other useful operations, such as searching for a text string, or splitting or combining various document files as required. For defined document content that is interactive in nature, the viewer application may provide a method of interacting with the PDF document. For example, a user may be able to type text into receptive text fields within the document, or to change the camera angle in a three-dimensional viewport for displaying a geometric model of a designed object.

In other situations, viewable content is not consumed in a fully interactive manner, but is instead serialised to a form suitable for sequential viewing. In such a situation, the term "output modality" may be used to describe the particular form in which the sequential viewing shall take place. For example, the document content may be serialised to a printing device (e.g., 1015) to produce one or more printed document pages, or the document content may be serialised to a display device (e.g., 1014) to produce a sequential presentation format. In such less-interactive examples, there may be certain pages of the document that are not appropriate or useful to include amongst the content that is serialised for display. The inclusion of such inappropriate content may be inconvenient or wasteful. For example, for printed output, printing consumables (ink, toner and/or paper) are consumed unnecessarily. For a presentation environment such as in a business meeting, displaying certain pages may interrupt the presenting person's workflow or require the presenting person to skip the displayed sequential presentation forward until they arrive at useful content.

Examples of document content that may be unsuitable for serialisation to a less interactive output modality include: documents created from templates that include some pages containing instructions about how to use the template; document pages that contain text entry fields to customize content that appears throughout the document; document pages that act as a placeholder for content that is not displayable in previous versions of document viewing application; instructions for navigating multimedia content in interactive applications.

When creating document content, the document author is in a unique position to use semantic designations to designate each page of content as being suitable for serialisation to a particular output modality. The document author can easily recognise pages that are superfluous, and particular content authoring applications may record semantic designation in an application-specific method. However, the PDF format is not capable of recording such semantic designations. Hence, when the application content is output to PDF format, the intention for each page of content to be displayed in a non-interactive output modality is lost. For example, when using some presentation software applications, a user may designate a slide as being "hidden". A hidden slide is a slide that is viewable when editing the entire presentation document, but when playing the document as a sequential displayed presentation that the hidden slide will be omitted. If the slide is output to an application-independent format (such as PDF), the hidden slides shall either be omitted entirely from the PDF document, or shall lose their designation as being hidden.

A PDF document may specify preferred page printing ranges. However, if a user wants to specify some alternative page ranges for printing, the user's selection overrides the default page range of the document.

PDF allows displayable content to be designated as optional. The optional content is definable on a per-object basis, or on groups of objects. However, if all the content on a page is designated as optional, a blank page would still be emitted when printing a part of the document including that page.

PDF also provides a mechanism by which a document may be designated as displayable on screen only, and not permitted to be printed (with protection granted by a password). Such a printing protection mechanism is of limited applicability as PDF only allows printing to be disallowed for the entire document.

The described arrangements may be implemented within a framework for processing a job originating from a document stored in a page description language, and will now be described in further detail by way of example with reference to FIG. 11.

Figure 11:
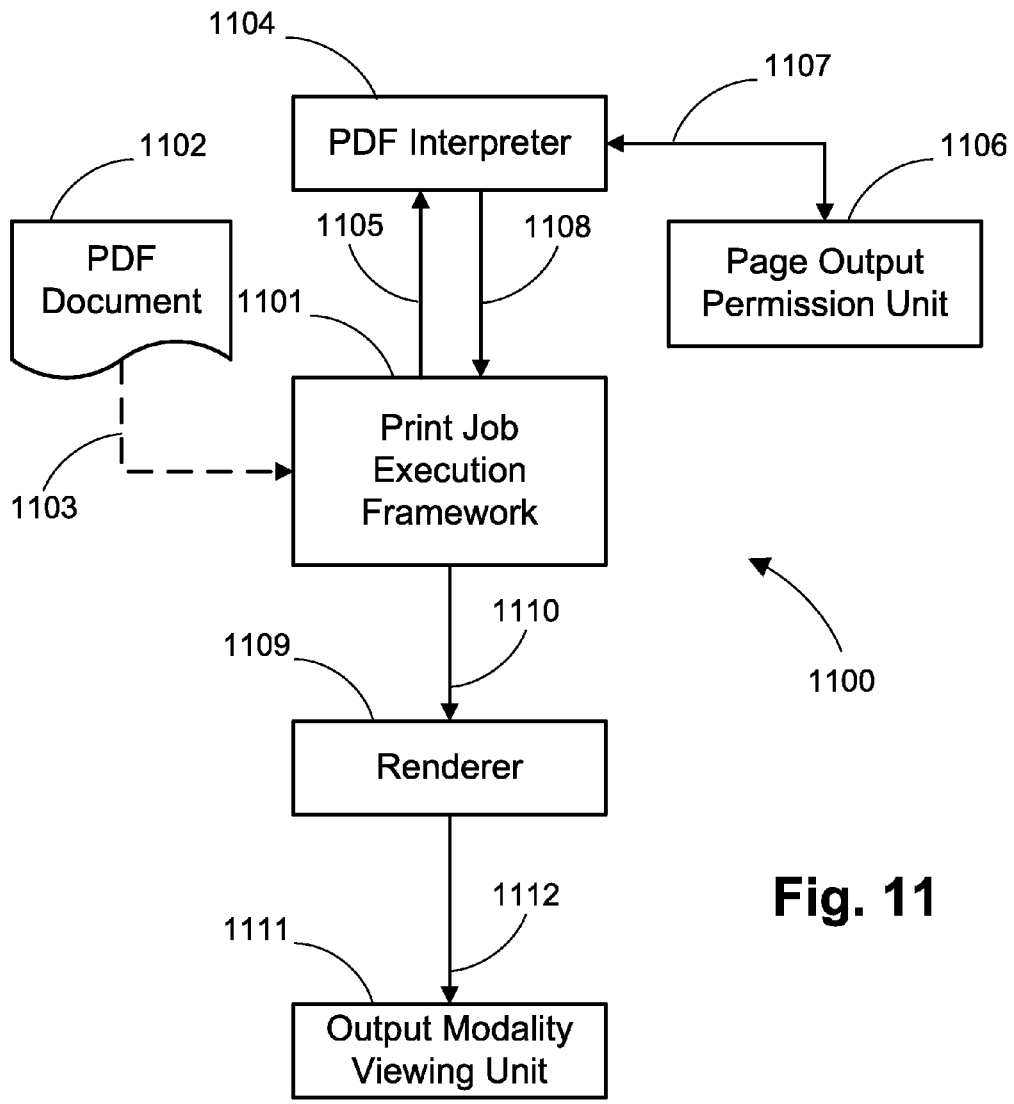
FIG. 11 is a schematic block diagram showing an example software architecture for implementing the described arrangements.

FIG. 11 shows an example software architecture 1100 for implementing the described arrangements. The software architecture 1100 of FIG. 11 includes modules 1101, 1104, 1106, 1109 and 1111. Each of the modules 1101, 1104, 1106 and 1111 may be implemented as one or more of the software code modules of the software 1033. Alternatively, as described above, the methods may be implemented in dedicated hardware where each of the modules 1101, 1104, 1106, 1109 and 1111 may be implemented as hardware modules.

A print job execution framework module 1101 receives a job in the form of a PDF document 1102, over a data channel 1103. The PDF document 1102 may be stored within the architecture 1100 in the form of a file, or may exist within the memory 1006. The job execution framework 1101 may inspect the format of the job document 1102, and determine that a PDF interpreting module 1104 is suitable for interpreting the job document 1102. The job document 1102 may be bundled together with additional information describing the job (such as a user-preferred set of page ranges, number of copies and so forth), and then the job is passed to the PDF interpreter module 1104 via a data channel 1105.

The PDF interpreter module 1104 receives the job document 1102, and communicates with a page output permission module 1106 in order to determine what subset of pages within the document 1102 are defined by the document to be outputable. Communication for determining the subset of pages defined to be outputable occurs over a data channel 1107. The PDF interpreter module 1104 then interprets page definitions corresponding to the determined subset of pages to produce a set of graphical object data corresponding to the content defined in the document for that subset of pages. The graphical object data is returned back to the job execution framework 1101 via a data channel 1108.

The graphical object data is passed to a renderer module 1109 via a data channel 1110, whereupon the graphical object data is rendered to form one or more images. Finally, the one or more images are forwarded to an output modality viewing module 1111 via a data channel 1112. An output modality viewing unit module 1111 is any device that allows the rendered image to be viewed by a user, and may be in a form such as a printer (e.g., 1015), interactive multimedia application, or video display (e.g., 1014).

The modules 1104, 1101, and 1109 in the FIG. 11 may be associated with one or more segments of the software application program 1033 and may be performed by the register section 1044, 1045, 1047, the ALU 1040, and the control unit 1039 in the processor 1005 working together to perform the fetch, decode, and execute cycles for every instruction in the instruction set for the noted segments of the software application program 1033.

The described arrangements add a set of data structures to the definition of PDF such that for a given output modality, the author's intention for that page to be included in an output serialisation of the document content may be both recorded when creating the document, and recalled when performing an output serialisation of the document.

The described arrangements may be implemented within a computer software product and may include a step of providing a document encoded in the PDF format, a step of selecting an output serialisation modality, and a step of serialising the content of the PDF format document according to the selected output serialisation modality. When serialised, the result is a representation of zero or more pages of the PDF document, in a form such as rendered pixels, according to the requirements and capabilities of the device targeted by the selected output modality.

Figure 12:
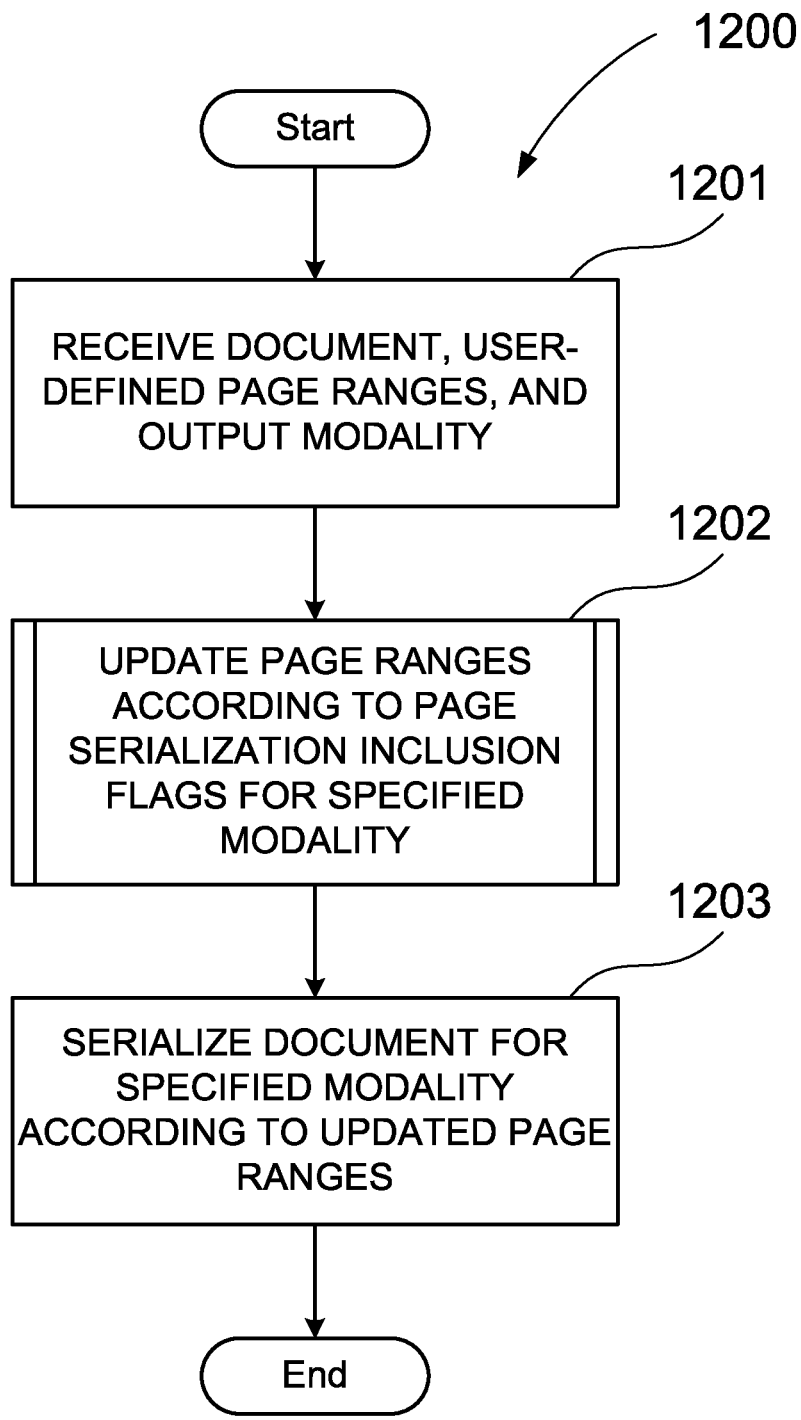
FIG. 12 is a schematic flow diagram showing a method of serialising a document.

A method 1200 of serialising a document will now be described with reference to FIG. 12. The method 1200 may be implemented as one or more code modules of the software application program 1033 resident on the module 1001 and being controlled in its execution by the processor 1005.

The method 1200 begins at receiving step 1201, in which a PDF document is received by the software 1033, under execution of the processor 1005. The PDF document may be stored in the memory 1006. The PDF document is received along with a user-defined set of page ranges. One output modality from amongst the output modalities provided by the system 1000 is also selected at step 1201. Each page range in the set of page ranges comprises either a single page number, or a pair of page numbers consisting of an initial page and a final page for that page range.

A page reference may be represented by an integer data value with the value '1' indicating the first defined page of the document, and so forth. Alternatively, a page reference may be given as a label defined by the PDF document, but is resolved to an integer page reference before proceeding. If given as a pair of numbers, then the page range is inclusive of the desired pages. As an example, if the set of page ranges is 1-3, 5, 9-12, the corresponding page set is {1, 2, 3, 5, 9, 10, 11, 12}.

Then at updating step 1202, the set of page ranges is modified according to serialisation inclusion data associated with the pages of the provided PDF document, and according to the specified output serialisation modality. A method 1300 of modifying a set of page ranges, as executed at step 1202, will be described in detail below with reference to FIG. 13.

A modified set of page ranges resulting from step 1202 may be stored in the memory 1006. The method 1200 then proceeds to serializing step 1203 in which the modified set of pages produced in step 1202 from the provided document is serialised for output according to the specified output serialisation modality. The serialised form of the PDF document may be stored by the software 1033 in the memory 1006 under execution of the processor 1005.

The serialised form of the provided PDF document omits pages according to serialisation inclusion data associated with page definitions in the provided PDF document. Pages that were not intended to be output for a particular output modality (and thus may be wasteful of printing consumables, for example) are not output in the serialised form of the PDF document.

The method 1300 of modifying a set of page ranges, as executed at step 1202, will now be described in detail below with reference to FIG. 13. The method 1300 produces a modified set of page ranges for output serialisation of the provided PDF document. The method 1300 may be implemented as one or more code modules of the software application program 1033 resident on the module 1001 and being controlled in its execution by the processor 1005.

The method 1300 begins at obtaining step 1301, where the next unprocessed page range from the input set of page ranges is obtained by the software 1033 under execution of the processor 1005. At step 1301, the obtained page range shall be the first page range from amongst the set of page ranges input at step 1201. For subsequent execution of step 1301, the subsequent page ranges shall be obtained.

The method 1300 then proceeds to creating step 1302, where a current sub-range is created as a temporary stored variable in the memory 1006 by the software 1033. The current sub-range includes a data value representing the starting page for the sub-range. The data value is initialised to the value of the first page within the current range obtained at step 1301.

Next, at obtaining step 1303, the method 1300 obtains the next unprocessed page within the current range obtained at step 1301. For the first time in which step 1303 is performed for the current range, the next unprocessed page shall be the first page within that range. For subsequent executions of step 1303 for the current range, the next unprocessed page shall be subsequent pages within that range.

The method 1300 then flows to decision step 1304, where the software 1033 determines if a serialisation output flag is set for the current page obtained at step 1303, with reference to data structures defined within the document being serialised and associated with the current page of the PDF document. If the flag is not set, then the method 1300 flows to decision step 1305.

At step 1305, if the software 1033 determines that there is a current sub-range stored in memory 1006, then the method 1300 proceeds to step 1306. At this point, the method 1300 has encountered a point at which the current range of pages to be output is punctuated by a page that is defined not to be outputable. Hence, the current range is to be split into two sub-ranges.

At step 1306, the current sub-range is emitted by the software 1033 (and thus the current sub-range is added to the originally-empty set of modified page ranges produced by the method 1300. The final page for the emitted sub-range is set to the page previous to the current page, as the page previous to the current page was the last encountered page for which output serialisation is defined to be permitted. The current sub-range is then cleared from memory 1006, meaning that in this state, determining if there is a current sub-range such as at step 1305 will result as a determination of "No".

After performing step 1306, or after performing decision step 1305 with a determination that no current sub-range exists, the method 1300 flows to decision step 1309.

At 1309, if there remains any unprocessed page within the current range, then the method 1300 returns to step 1303 to obtain the next unprocessed page within the current range, and proceeds as previously described, as a loop of processing steps. Otherwise, if instead at decision step 1309 it is determined that there do not remain any unprocessed pages within the current range, then the method 1300 proceeds to step 1310.

At step 1310, the current sub-range is emitted, using the current page as the final page for that sub-range. Step 1310 is only required if a current sub-range exists. It is possible for the method 1300 to encounter step 1310 when the current sub-range has already been cleared at step 1306.

The method 1300 then proceeds to decision step 1311, where if there remains any further ranges to process, then the method 1300 iterates by returning to step 1301, with each iteration obtaining the next range. Otherwise, the method 1300 ends.

Returning to decision step 1304, if the software 1033 determines that the output serialisation flag for the current page is set, then the method 1300 proceeds to decision step 1307.

If the software 1033 determines at step 1307 that there is no current sub-range stored in memory 1006, then the method 1300 proceeds to step 1308. Otherwise, the method 1300 proceeds to decision step 1309 as described above. At step 1308, a current sub-range is created and stored in the memory 1006 under execution of the processor 1005. The sub-range is created with the current page stored as the starting page for the current sub-range.

As described above, the method 1300 iterates through each page in each page range, and splits each page range into zero or more page sub-ranges. During the splitting operation, the current sub-range is terminated when a non-outputable page is encountered. A new page range resumes at the point when the next subsequent outputable page is found.

Figure 13:
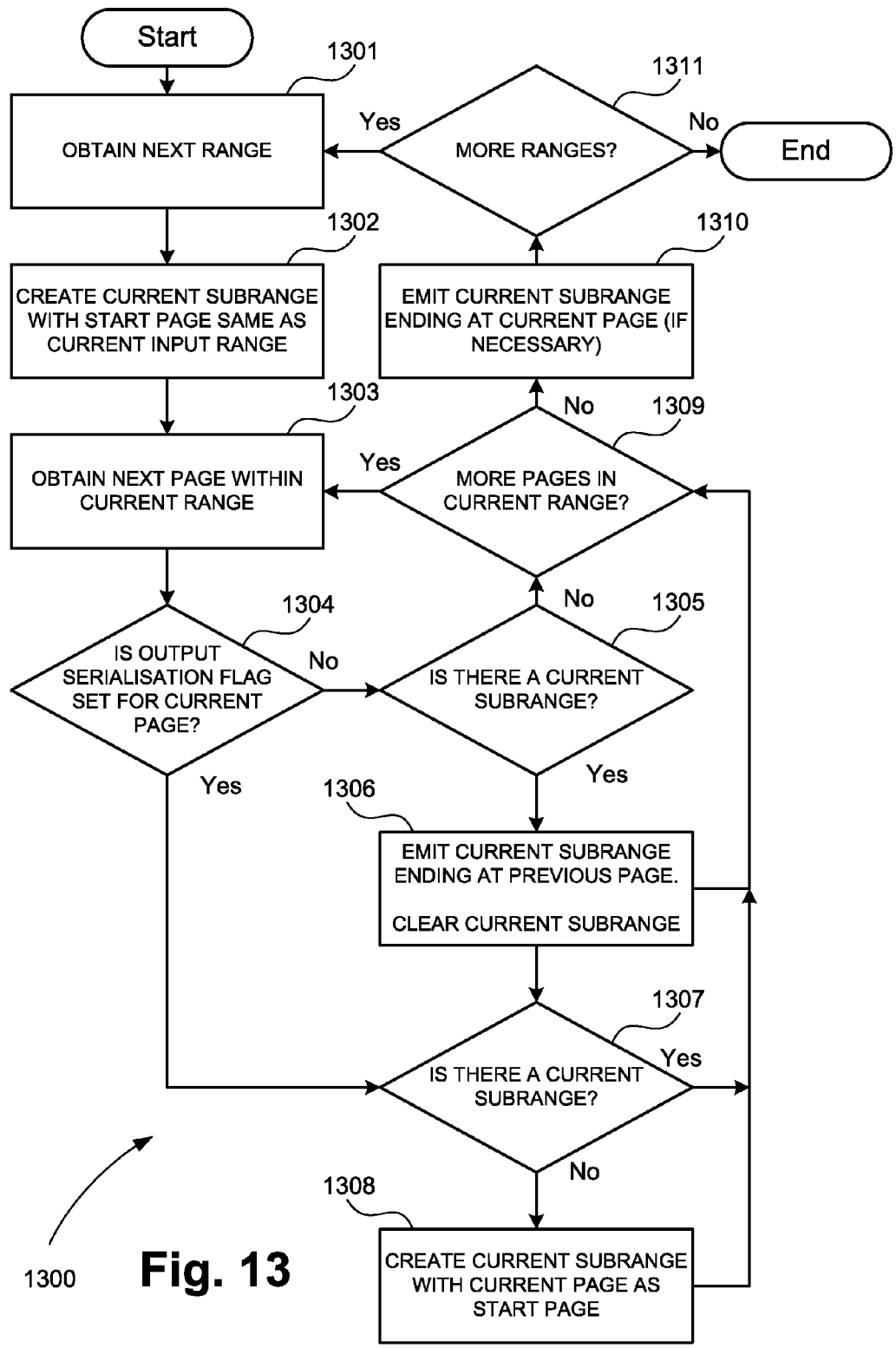
FIG. 13 is a schematic flow diagram showing a method of modifying a set of page ranges for producing a serialised output form of a document.

The method 1300 of FIG. 13 may alternatively determine sets of individual pages, rather than page ranges. In this instance, the updated set of page ranges described with reference to steps 1202 and 1203 may be derived by subtracting the set of non-outputable pages from the set of requested pages, and then collapsing the resulting set into one or more contiguous page ranges.

Figure 14:
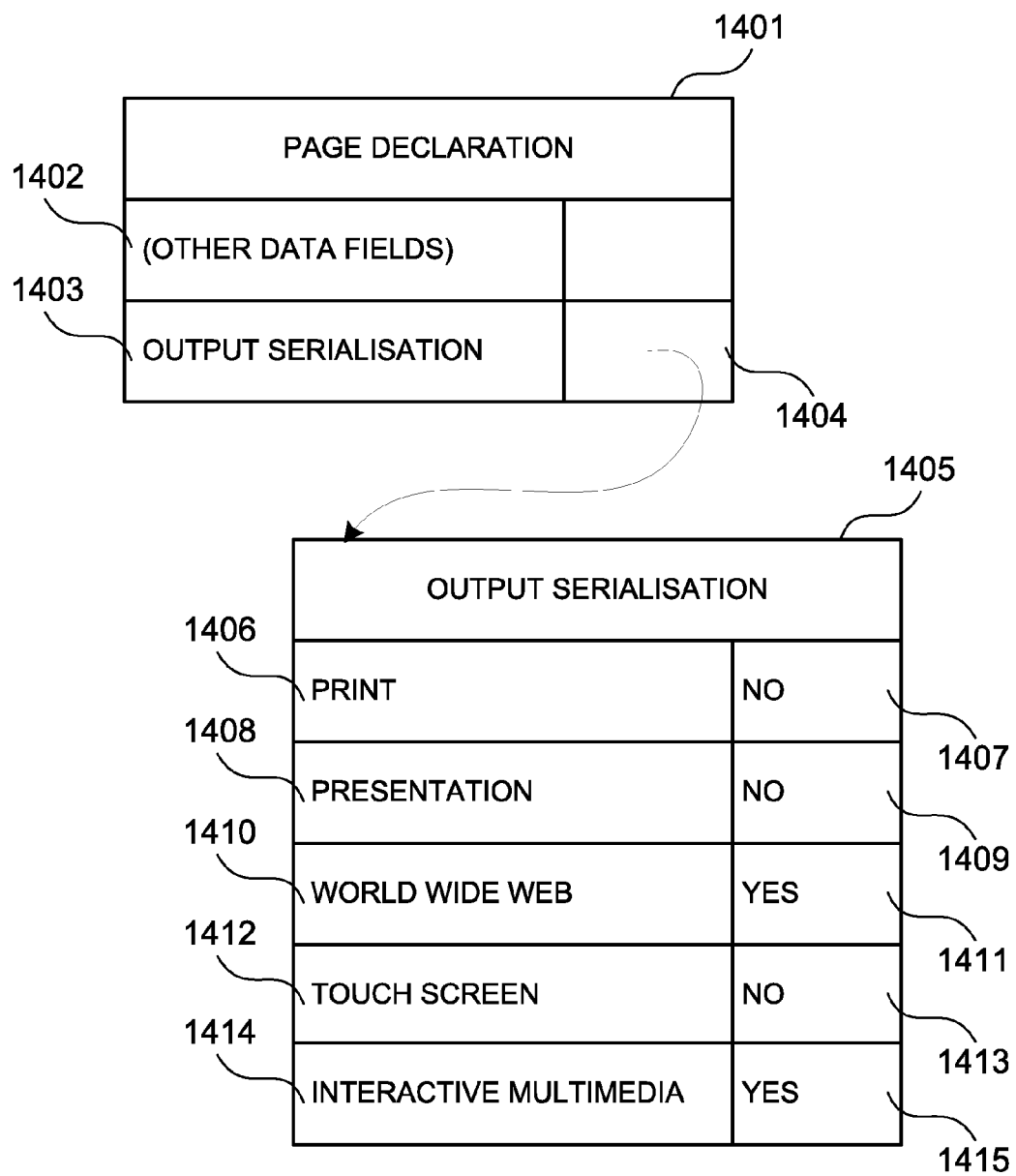
FIG. 14 is a schematic block diagram showing a data structure for defining whether a document page is permitted to be output.

FIG. 14 shows an example data structure for recording the serialisation flag data. Although described above as being implemented as a PDF dictionary, the serialisation flag data may be recorded or arranged in many other forms, including arrays, name trees or data streams, for example. As seen in FIG. 14, a PDF page dictionary 1401 contains data fields 1402 containing data values or references to other data structures relevant to a particular page of the PDF document. The data values may include, for example, declarations such as page sizes, page cropping area sizes, page rotation information, page thumbnail images, page annotation definitions. Each page of the PDF document has its own instance of a page declaration data structure 1401.

In the arrangement of FIG. 14, an output serialisation data field 1403 is defined within the PDF page declaration data structure 1401. A data value 1404 for the data field 1403 is a reference to another data structure 1405. The data structure 1405 is a PDF dictionary object, defining any number of output modality data fields, for example, 1406, 1408, 1410, 1412 and 1414. Each such output modality data field is associated with a data value, examples of which are provided in FIG. 14 as data values 1407, 1409, 1411, 1413 and 1415. The data value for an output modality data field indicates whether or not the document page defined by the page declaration data structure 1401 should be serialised for output for the given output modality. In the example of FIG. 14 the data value for the output modality data field is stored as a data value with values "YES" and "NO".

In the example of FIG. 14, a particular page of a document is defined such that when the document is serialised for non-interactive output in the form of a printed document, a sequential video presentation, or a sequential touch screen application, then that particular page is not be included amongst the output pages. Additionally, when the particular page is output for use in a world-wide-web application, the particular page is included. Such a definition has arisen in the example of FIG. 14 from some aspect or content type on the example page that is not useful in the excluded output modalities, but that is supported or useful in a world-wide-web output modality. The particular page may be defined by the author or authoring application of the document. The set of output modalities shown in FIG. 14 is an example. The data structure 1405 is not limited to any particular set of output modalities.

For the example of FIG. 14, the output modalities recorded in the output serialisation permission data 1405 are as follows:

(i) A print output modality 1406 representing serialised image output that is recorded on a physical printing substrate such as paper, cardboard or polymer film, on a printing device. The printing substrate is a passive medium and as such does not offer any direct interactive capabilities.

(ii) A presentation output modality 1408 representing a serialised image output that is typically displayed on a video device that includes a projector apparatus. During viewing of a presentation output, a user may interact with the output by requesting the next or previous page of image content to be displayed. Alternatively, a transition to a next or previous page may occur automatically as triggered by of a timer.

(iii) A world wide web output modality 1410 representing a serialised form of output that is viewed within an application for displaying hyperlinked content such as HTML. The output modality 1410 offers some degree of interactivity. For example, different pages of content may be directly navigated to by interacting with embedded hyperlinks within the displayed document content.

(iv) A touch screen output modality 1412 representing a serialised form of output that is typically viewed upon a handheld computing device or tablet computer. The output modality 1412 offers a high degree of interactivity, and may include custom handling for complex interaction with content within the displayed document. Similarly, an interactive multimedia output modality 1414 offers a high degree of interactivity and incorporates content from a wide variety of sources.

A PDF document may be defined as a PDF "portfolio" document, in which one or more additional content files are embedded within the PDF document. In this instance, the PDF document and the additional content files are considered as a single "package" of content. The PDF portfolio document additionally declares information that controls the manner in which the document is to be presented within the context of an interactive viewing application. For example, the PDF document itself may define one of the embedded content files as being the default view. In such an example, an interactive viewing application will automatically extract that embedded content file and present the embedded content file to the user as the initial view. The PDF portfolio document may also define the intended type of user interface that should be presented to the user in order to interactively navigate throughout the primary content of the PDF portfolio document, and any corresponding embedded content files.

Figure 15:
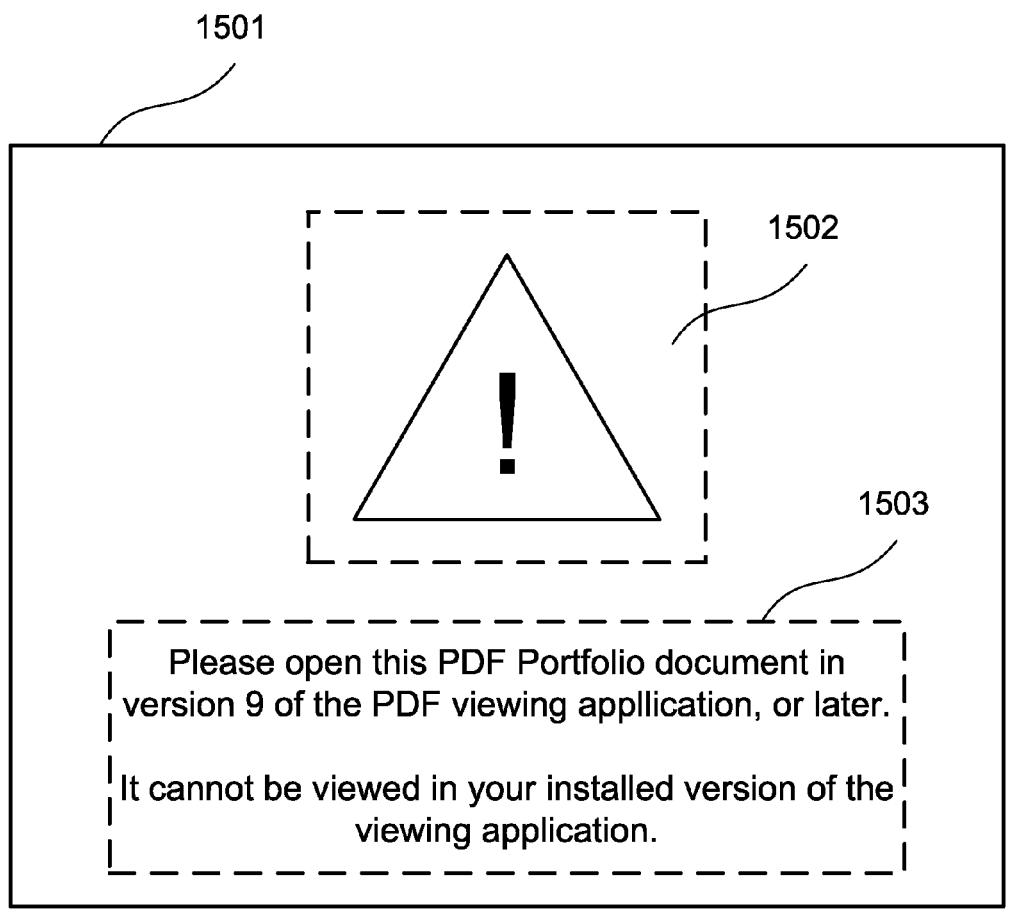
FIG. 15 shows an example non-outputable document page.

In one arrangement, the primary content of the PDF portfolio document may not intended to be viewed, with only the content of the embedded files being intended for use. In such an arrangement, the first and only page of the primary PDF document is only seen when the document is erroneously loaded into a viewing application that does not support the viewing of PDF portfolio type documents. The content of that page may be a graphical message inviting the user to obtain a newer version of the PDF viewing application being used, where the newer version supports PDF Portfolio documents. FIG. 15 shows an example graphical representation 1501 where a document page 1501 includes a graphic element 1502 designed to alert the user to obtain a newer version of the PDF viewing application being used. As seen in FIG. 15, the document page 1501 includes a textual message 1503 informing the user that the document is not supported for viewing within the current viewing application.

When a PDF portfolio document as described above is to be serialised for an output modality, such as for output on the printing device 1015, the content of the primary document as well as one or more of the embedded content documents may be output to the device 1015. In the case in which the content of the primary document is not intended to be printed, superfluous printed material is produced. Such superfluous pages may be defined as, for example, not outputable for the output modality of "Printed Page". When identified as non-outputable at authoring time, and outputted according to the processes described in FIG. 12 and FIG. 13, the described arrangements are able to ensure that printing the entire contents of the PDF portfolio document does not cause wasteful use of printing consumables.

In another arrangement, a PDF document may be further defined according to the PPML/VDX standard (i.e., as described in ISO 16612-1:2005). Although a document defined according to the PPML/VDX standard has the usual structure of PDF page definitions, the document may also have PPML declarations that define a document template. When viewed in an application that fully supports the PPML/VDX standard, the normal examination of the PDF page definitions is suppressed, and instead a view of the document contents is constructed dynamically from the PPML template by assembling the content obtained from the PDF page definitions, as indicated by the PPML data. However, when viewed in a PDF-only application, the document defined according to the PPML/VDX standard is displayed using the PDF page structure only. Hence, various pages which comprise content intended for assembly using PPML will be output when the document is serialised for an output modality. Furthermore, such documents may include one or more pages that, similar to the PDF portfolio example described above, include only a message as exemplified in FIG. 15. The described arrangements may be applied to PDF documents that employ the PPML/VDX standard in order to prevent such pages from being output unnecessarily, by recording in a data structure the intention that those pages are not suitable for output.

The described arrangements therefore provide a method by which the advantages of an application-independent document format are retained while simultaneously allowing authoring-time designations to be recorded so as to control per-page permission for output serialisation of document content.

INDUSTRIAL APPLICABILITY

The methods described above are applicable to the computer and data processing industries may be used in implementations that include, for example:
(i) hardware devices for outputting or displaying rendered documents;
(ii) driver software for controlling hardware devices (or supplying rendered versions of documents);
(iii) interactive software applications for displaying or otherwise utilising documents defined in a page description language; or
(iv) as part of a remote computing service for outputting, displaying, rendering or processing documents defined in a page description language.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A computer implemented method for reproducing a document associated with a page description language structure, the page description language data structure describing a watermark annotation and imageable content, the method comprising:
   receiving an initial placement of the watermark annotation on an output medium, the initial placement of the watermark annotation being independent of a placement of the imageable content on the output medium;
   determining at least one adjustment value for the watermark annotation on the output medium if the initial placement of the watermark annotation does not overlap the imageable content on the output medium, so that the watermark annotation at least partially overlaps the imageable content on the output medium;
   adjusting the watermark annotation in accordance with the determined adjustment value; and
   reproducing the adjusted watermark annotation and the imageable content using the output medium.

2. The method according to claim 1, wherein the imageable content is defined by the page description language.

3. The method according to claim 1, wherein the initial placement is defined by a page description language defining the imageable content.

4. The method according to claim 1, further comprising modifying a horizontal placement value of the watermark relative to dimensions of the output medium.

5. The method according to claim 1, further comprising modifying a vertical placement value of the watermark relative to dimensions of the output medium.

6. The method according to claim 1, further comprising modifying a size of the watermark annotation.

7. The method according to claim 1, further comprising rotating the watermark annotation about a point on the output medium.

8. The method according to claim 1, wherein the imageable content is defined in accordance with the Portable Document Format (PDF) file format.

9. The method according to claim 1, wherein values for adjusting the initial placement are defined within a data structure associated with the watermark annotation.

10. An apparatus for reproducing a document associated with a page description language data structure, the page description language data structure describing a watermark annotation and imageable content, the apparatus comprising:
a processor, and a memory storing instructions that, when executed by the processor, cause the system to:
   receive an initial placement of the watermark annotation on an output medium, the initial placement of the watermark annotation being independent of a placement of the imageable content on the output medium;

determine at least one adjustment value for the watermark annotation on the output medium if the initial placement of the watermark annotation does not overlap the imageable content on the output medium, so that the watermark annotation at least partially overlaps the imageable content defined on the output medium;

adjust the watermark annotation in accordance with the determined adjustment value; and reproduce the adjusted watermark annotation and the imageable content using the output medium.

11. A non-transitory computer-readable storage medium having recorded thereon a computer program that, when executed by a computer, causes the computer to reproduce a document associated with a page description language data structure, the page description language structure describing a watermark annotation and imageable content, the computer program comprising:

Code for receiving an initial placement of the watermark annotation on an output medium, the initial placement of the watermark annotation being independent of a placement of the imageable content on the output medium;

code for determining at least one adjustment value for the watermark annotation on the output medium if the initial placement of the watermark annotation does not overlap the imageable content on the output medium, so that the watermark annotation at least partially overlaps the imageable content defined on the output medium;

code for adjusting the watermark annotation in accordance with the determined adjustment value; and code for reproducing the adjusted watermark annotation and the imageable content using the output medium.

12. A non-transitory computer readable medium comprising a page description language data structure stored thereon, the page description language data structure describing an imageable content of a page and an annotation to the imageable content to be mapped to an output medium for displaying the page, the page description language data structure comprising an annotation placement data structure defining a placement of the annotation on the output medium, the annotation placement data structure comprising:

at least one placement value for the annotation relative to dimensions of the output medium, wherein the placement value is independent of the placement of the imageable content on the output medium; and one or more placement adjustment values that when combined with the placement value provide for an overlap on the output medium between the imageable content and the annotation, the overlap depending on the spatial parameters of the output medium, wherein the placement of the annotation on the output medium is based on the overlap.

13. The annotation placement data structure according to claim 12, wherein the imageable content is defined by a page description language conforming to the Portable Document Format (PDF) file format.

14. The annotation placement data structure according to claim 12, wherein a position of the annotation is adjustable.

15. The annotation placement data structure according to claim 12, wherein a size of the annotation is adjustable.

16. The annotation placement data structure according to claim 12, wherein rotation of the annotation is adjustable.

17. The annotation placement data structure according to claim 12, wherein the placement is adjusted so as to maximise the overlap of the annotation with the position of the imageable area on the page.

18. A computer implemented method for reproducing a document in a page description language, the method comprising:

receiving a document comprising imageable content and an annotation to the imageable content, the document being associated with a page description language data structure comprising an image content description and an annotation description;

determining placement of the annotation on an output medium using at least one spatial parameter of the output medium and the annotation description;

matching placement of the image imageagle content and the placement of the annotation to determine an amount of overlap between the annotation and the imageable content on the output medium;

determining an adjustment value for an adjusted placement of the annotation on the output medium based on the matching, so that the annotation at least partially overlaps the imageable content on the output medium;

adjusting the annotation in accordance with the determined adjustment value; and reproducing the document on the output medium using the adjusted annotation and the imageable content.

* * * * *